United States Patent
Bercovici et al.

(10) Patent No.: US 12,370,767 B2
(45) Date of Patent: Jul. 29, 2025

(54) SYSTEM AND METHODS FOR FABRICATION OF CURED ARTICLES

(71) Applicant: TECHNION RESEARCH & DEVELOPMENT FOUNDATION LIMITED, Haifa (IL)

(72) Inventors: Moran Bercovici, Haifa (IL); Valeri Frumkin, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 155 days.

(21) Appl. No.: 17/990,692

(22) Filed: Nov. 20, 2022

(65) Prior Publication Data

US 2023/0085434 A1    Mar. 16, 2023

Related U.S. Application Data

(63) Continuation of application No. PCT/IL2021/050580, filed on May 19, 2021.

(60) Provisional application No. 63/026,870, filed on May 19, 2020.

(51) Int. Cl.
B29D 11/00    (2006.01)

(52) U.S. Cl.
CPC .. *B29D 11/00134* (2013.01); *B29D 11/00259* (2013.01); *B29D 11/00538* (2013.01)

(58) Field of Classification Search
CPC ........ B29D 11/00134; B29D 11/00259; B29D 11/00538
See application file for complete search history.

(56) References Cited

U.S. PATENT DOCUMENTS

| 2,542,386 A | * | 2/1951 | Beattie ............. B29D 11/00538 264/2.3 |
| 2,760,233 A | | 8/1956 | Bjorksten |
| 3,038,210 A | * | 6/1962 | Hungerford ........... G02B 1/041 264/2.6 |
| 3,251,908 A | * | 5/1966 | Wilenius ................ B29C 39/26 425/173 |

(Continued)

FOREIGN PATENT DOCUMENTS

| GB | 2543616 A | 4/2017 |
| WO | 2014126834 A2 | 8/2014 |

OTHER PUBLICATIONS

Frumkin, V. & Bercovici, M. Fluidic Shaping of Optical Components. ArXiv200509898 Phys. (2020).at <http://arxiv.org/abs/2005.09898>.

(Continued)

*Primary Examiner* — Virak Nguon
(74) *Attorney, Agent, or Firm* — The Roy Gross Law Firm, LLC; Roy D. Gross

(57) ABSTRACT

A fabrication system comprising a chamber containing an immersion liquid, a reservoir comprising a curable liquid being immiscible with said immersion liquid, the reservoir in fluid communication with a port configured for transferring the curable liquid into said chamber; an actuator configured for being in operable communication with said reservoir; a support configured for binding said curable liquid and in operable communication with said port. Further, a method for manufacturing a cured article with a predetermined shape is provided.

8 Claims, 24 Drawing Sheets

(56) References Cited

U.S. PATENT DOCUMENTS

2009/0194892 A1     8/2009   Lee
2023/0347604 A1*   11/2023   Aschwanden ......... B33Y 30/00

OTHER PUBLICATIONS

M. Elgarisi, V. Frumkin, O. Luria, and M. Bercovici, "Fabrication of freeform optical components by fluidic shaping," Optica 8, 1501-1506 (2021) https://doi.org/10.1364/OPTICA.438763.

Gadelmawla, E. S., Koura, M. M., Maksoud, T. M., Elewa, I. M., & Soliman, H. H. (2002). Roughness parameters. Journal of materials processing Technology, 123(1), 133-145. https://doi.org/10.1016/S0924-0136(02)00060-2.

Bhushan, B. (2000). Surface roughness analysis and measurement techniques. In Modern tribology handbook, two volume set (pp. 79-150). CRC press.

M. Hollaus et al. (2014), Forest resources and LiDAR—A Review of Surface Roughness Concepts, Indices and Applications, NEWFOR—Interreg Alpine Space project.

M. Falahati, W. Zhou, A. Yi, and L. Li. Fabrication of polymeric lenses using magnetic liquid molds. Appl. Phys. Lett. 114, 203701 (2019); https://doi.org/10.1063/1.5090511.

Boyko, E., Eshel, R., Gommed, K., Gat, A., & Bercovici, M. (2019). Elastohydrodynamics of a pre-stretched finite elastic sheet lubricated by a thin viscous film with application to microfluidic soft actuators. Journal of Fluid Mechanics, 862, 732-752. doi:10.1017/jfm.2018.967.

Boyko E, Eshel R, Gat AD, Bercovici M. Nonuniform Electro-osmotic Flow Drives Fluid-Structure Instability. Phys Rev Lett. Jan. 17, 2020;124(2):024501. doi: 10.1103/PhysRevLett.124.024501. PMID: 32004032.

Boyko, E., Ilssar, D., Bercovici, M., & Gat, A. D. (2020). Interfacial instability of thin films in soft microfluidic configurations actuated by electro-osmotic flow. Physical Review Fluids, 5(10). doi: 10.1103/physrevfluids.5.104201.

Paratore F, Bacheva V, Kaigala GV, Bercovici M. Dynamic microscale flow patterning using electrical modulation of zeta potential. Proc Natl Acad Sci U S A. May 21, 2019;116(21):10258-10263. doi: 10.1073/pnas.1821269116. Epub May 6, 2019. PMID: 31061121; PMCID: PMC6534970.

Paratore F, Boyko E, Kaigala GV, Bercovici M. Electroosmotic Flow Dipole: Experimental Observation and Flow Field Patterning. Phys Rev Lett. Jun. 7, 2019;122(22):224502. doi: 10.1103/PhysRevLett. 122.224502. PMID: 31283260.

Frumkin, V., Gommed, K., & Bercovici, M. (2019). Dipolar thermocapillary motor and swimmer. Physical Review Fluids, 4(7). doi:10.1103/physrevfluids.4.074002.

Elgarisi, M., Frumkin, V., Luria, O., & Bercovici, M. (2021). Fluidic Shaping of Freeform Optical Components. arXiv preprint arXiv:2103.02765.

PCT International Search Report for International Application No. PCT/IL2021/050580, mailed Aug. 21, 2021, 9pp.

PCT Written Opinion for International Application No. PCT/IL2021/050580, mailed Aug. 21, 2021, 7pp.

PCT International Preliminary Report on Patentability for International Application No. PCT/IL2021/050580, issued Nov. 17, 2022, 8pp.

* cited by examiner

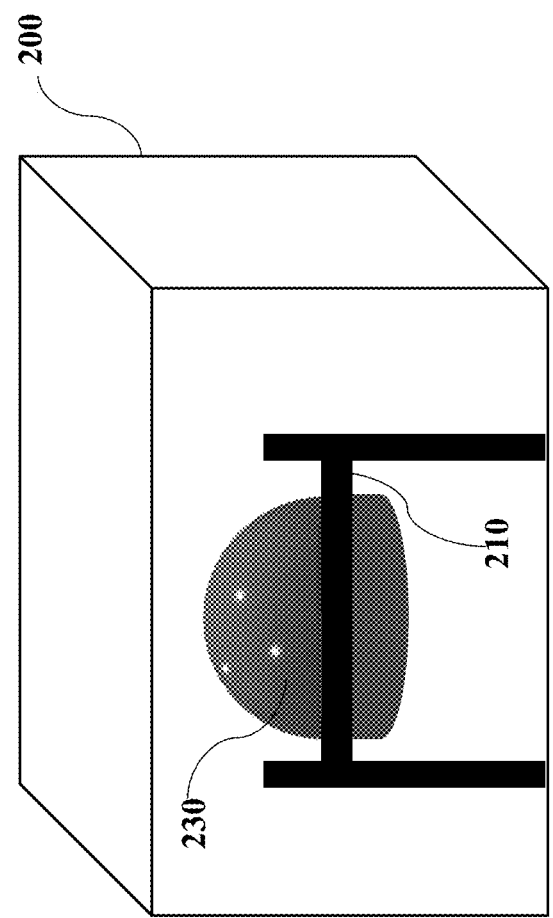
Figure 3B1

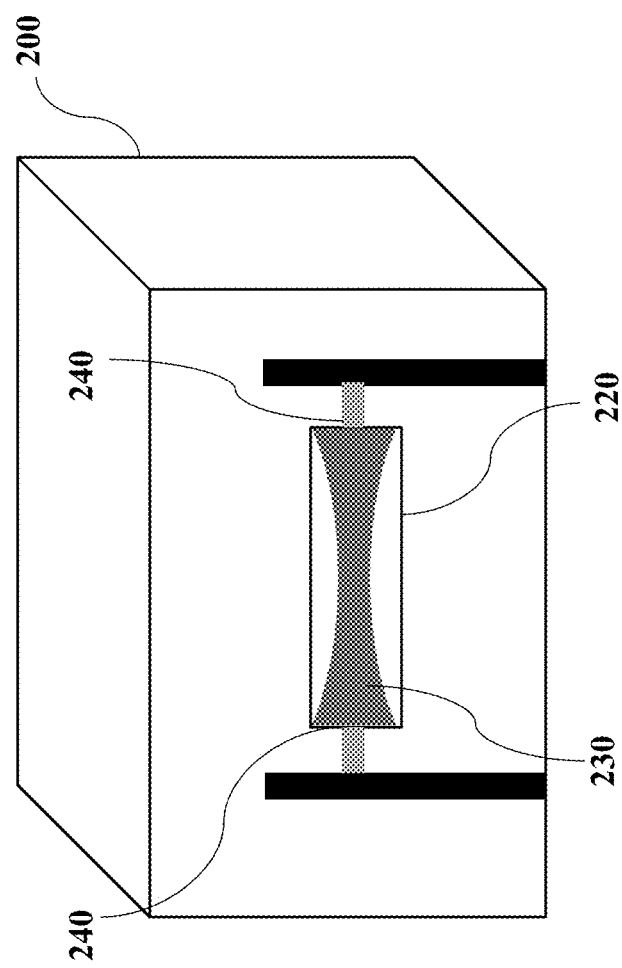
Figure 3B2

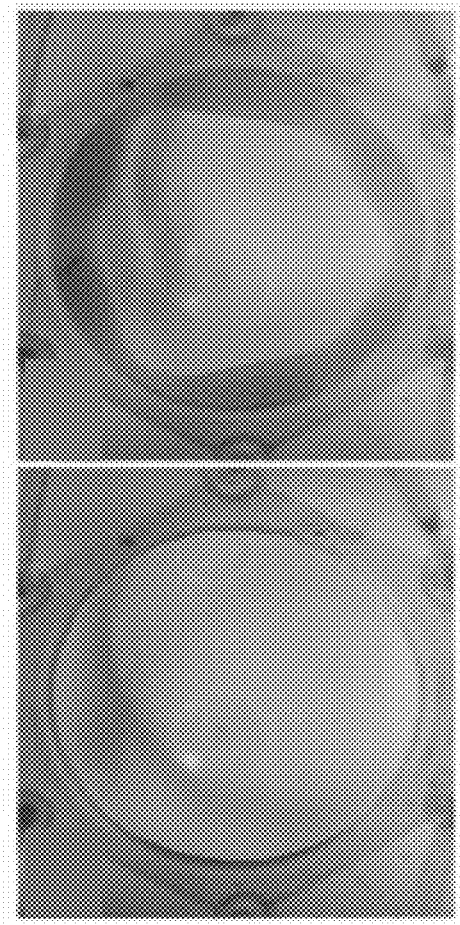
Figure 10C
Figure 10D
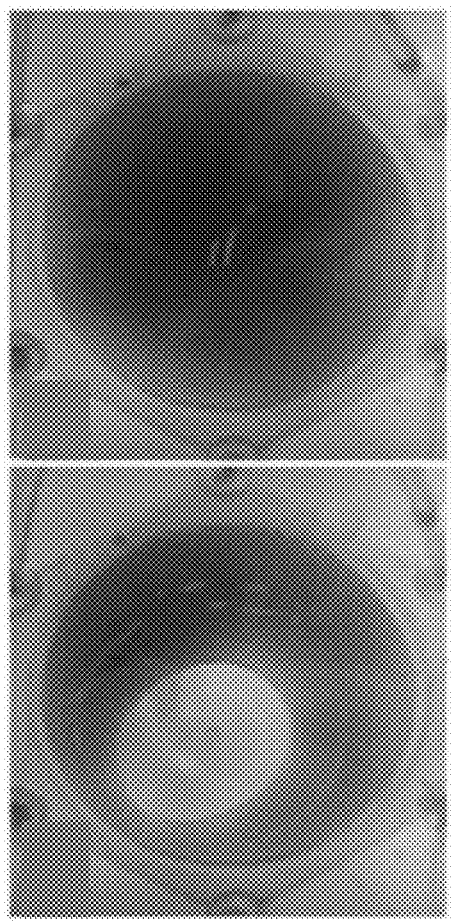
Figure 10E
Figure 10F

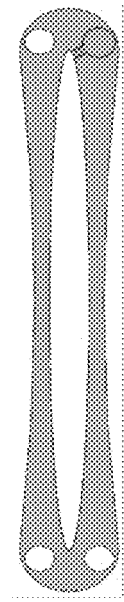
Figure 11E
Figure 11F
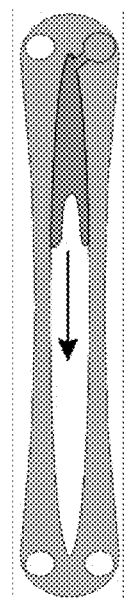
Figure 11G
Figure 11H
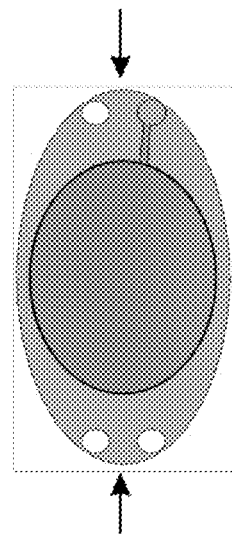
Figure 11I

SYSTEM AND METHODS FOR FABRICATION OF CURED ARTICLES

CROSS REFERENCE TO RELATED APPLICATIONS

This application is a Bypass Continuation of PCT Patent Application No. PCT/IL2021/050580 having International filing date of May 19, 2021, which claims the benefit of priority under 35 U.S.C. § 119(e) of U.S. Provisional Patent Application No. 63/026,870, filed on May 19, 2020, the contents of which are all incorporated herein by reference in their entirety.

FIELD OF THE INVENTION

The invention relates generally to the field of cured articles.

BACKGROUND

Lenses are a key component of any optical system, from microscopes to telescopes, holograms, eye-glasses, data storage, lasers, and many more. Direct fabrication of lenses, whether through form-giving methods or by microstructuring techniques, relies on mechanical processing such as grinding and machining, followed by polishing of the optical surfaces. The requirement for high quality surfaces requires specialized and expensive equipment, and the fabrication of non-standard optical surfaces remains a challenge. Molding-based methods significantly improve the cost-effectiveness of fabrication, as a single mold can be used to produce a large number of lenses. However, the fabrication of the molds themselves suffers from similar difficulties as direct fabrication.

Due to the currently required infrastructure for lens fabrication, rapid prototyping remains a significant challenge. It is natural to consider 3D printing technologies as a potential platform for lens prototyping, yet thus far the quality of prints is inadequate for high quality optical application. Furthermore, 3D printing time is proportional to the volume being printed and thus large lenses or a large number of lenses requires substantial time to fabricate.

Very small lenses can be produced rapidly and with a high surface quality, by leveraging the smooth liquid-air interface of small polymer droplets, followed by their polymerization. The size restriction is imposed by the relative importance of gravitational to surface tension forces, characterized by the capillary length of the liquid polymer, which for most liquids at standard conditions is <3 mm. As the diameter of the droplet approaches the capillary length, gravitational forces become dominant. On top of a horizontal surface, large droplets will be flattened by gravity, resulting in loss of their spherical shape. The size of such lenses is also limited to a very narrow range of small diameters. Therefore, it will be highly advantageous to provide a simple method for rapid fabrication of a variety of high surface-quality lenses, that is not limited by size and does not require specialized equipment.

The foregoing examples of the related art and limitations related therewith are intended to be illustrative and not exclusive. Other limitations of the related art will become apparent to those of skill in the art upon a reading of the specification.

SUMMARY

The following embodiments and aspects thereof are described and illustrated in conjunction with systems, tools and methods which are meant to be exemplary and illustrative, not limiting in scope.

In one aspect of the invention, there is a fabrication system comprising a chamber suitable for containing an immersion liquid, a port adapted for being in fluid communication with a reservoir comprising a curable liquid; an actuator in operable communication with said reservoir and configured to induce flow of said curable liquid towards said port; a support in operable communication with said port, wherein said support is configured for binding said curable liquid; a control unit configured to control said actuator to induce flow of a predetermined volume of said curable liquid towards said port, so as to provide said curable liquid in contact with said support; wherein said predetermined volume is sufficient for shaping an article comprising at least one surface with a pre-defined curvature.

In one embodiment, the curable liquid and said immersion liquid are immiscible, and wherein a contact angle of said curable liquid on top of said support is less than 90°.

In one embodiment, the article is immersed within said immersion liquid, and wherein a control unit is configured to determine the pre-defined curvature of said article based on buoyancy induced by said immersion liquid.

In one embodiment, the control unit is configured to: (i) receive a pre-defined curvature of said article; and (ii) control said actuator to induce flow of the curable liquid according to the received pre-defined curvature.

In one embodiment, the control unit is further in operable communication with an additional actuator, and wherein said control unit is configured to receive a pre-defined curvature of said article; and (ii) further configured to control via said additional actuator at least one of: (i) a volume, and (ii) a density of the immersion liquid, according to the received pre-defined curvature.

In one embodiment, the support is in a form of a binding layer, a container or in a form of a binding frame.

In one embodiment, the chamber comprises a first reservoir facing the first surface of the article and a second reservoir facing the second surface of the article, and wherein said first reservoir and said second reservoir are configured to contain said immersion liquid.

In one embodiment, the support is located between said first reservoir and said second reservoir.

In one embodiment, the control unit is configured to receive a pre-defined curvature of the first surface and of the second surface; and further configured to control at least one of: (i) a volume, and (ii) a density of the immersion liquid within said first reservoir and within said second reservoir, according to the received pre-defined curvature.

In one embodiment, the fabrication system further comprises a curing element suitable for homogenously curing the curable liquid.

In one embodiment, the curing element is selected from a light source, a heating element or both.

In another aspect, there is provided a method for manufacturing an article with a predetermined curvature comprising providing a fabrication system comprising: a chamber containing an immersion liquid, a reservoir comprising a curable liquid being immiscible with said immersion liquid; wherein the reservoir is in operable communication with an actuator; a port in fluid communication with said reservoir; a support configured for binding said curable liquid; wherein said port is in operable communication with the support; (ii)

injecting a predetermined volume of said curable liquid on top or in close proximity to said support, so as to obtain at least one surface of said curable liquid immersed within said immersion liquid, thereby providing a predetermined shape to said at least one surface; (iii) providing said predetermined volume of the curable liquid under conditions sufficient for curing, thereby manufacturing said article.

In one embodiment, the port is configured for providing said curable liquid in contact with the support.

In one embodiment, the article is a lens having at least one optical surface with a predetermined curvature.

In one embodiment, the curvature of said at least one optical surface is predetermined by the buoyancy induced by said immersion liquid and by the volume of said curable liquid.

In one embodiment, the predetermined volume is sufficient for (i) binding said curable liquid to said support and (ii) for shaping said article.

In one embodiment, the immersion liquid has a density set to provide a buoyancy sufficient for manufacturing said article.

In one embodiment, the method further comprises step (iv) of controlling said curvature by modifying at least one of: a) a volume of said immersion liquid and b) a volume of said curable liquid.

In one embodiment, the conditions sufficient for curing comprise exposing said curable liquid to thermal radiation, UV/vis irradiation or both.

In one embodiment, the fabrication system is the fabrication system of the invention.

In another aspect, there is an article comprising a cured polymer, and comprising a non-spherical and non-cylindrical surface characterized by Equation 1:

$$\frac{r^2 h_{rr}\left(1 + \frac{1}{r^2} h_\theta^2\right) + (rh_r + h_{\theta\theta})(1 + h_r^2) - 2h_\theta h_r h_{r\theta} + \frac{2}{r} h_r h_\theta^2}{\left(1 + h_r^2 + \frac{1}{r^2} h_\theta^2\right)^{3/2}} = \pm(Ah + B)r^2,$$

wherein r is a normalized radius variable, h is a normalized surface height variable, subscripts denote spatial derivatives of h with respect to a radial direction or to an azimuthal direction, and A and B are free parameters.

In one embodiment, the article is an optical article lens.

In one embodiment, the surface comprises a plurality of regions having different focal lengths.

In one embodiment, the lens has an optical axis.

In one embodiment, the article is transparent in a wavelength range ranging from UV to IR.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

FIG. 2A is positive spherical lens. FIG. 2B is a doublet lens produced by a two-step process, where a negative lens was used as a binding frame for a positive lens made from a different material (here colored blue for better visualization). FIG. 2C is a saddle (toroidal) lens and FIG. 2D a cylindrical lens, produced using different lens liquid volumes injected into the same rectangular binding surface. FIG. 2E is a bi-focal lens produced by a two-step process, where a first lens was cut in half and used as part of a new binding surface for a second lens with different curvature. FIG. 2F is a negative meniscus lens produced by increasing the volume enclosed below the lens. FIG. 2G is a 200 mm diameter spherical telescope lens.

FIGS. 3A-C present a schematic and a non-limiting illustration of an exemplary fabrication system of the invention. FIG. 3A represents a support in a form of binding layer (e.g. pad). FIGS. 3B1-2 represent a support in a form of a binding frame (e.g. binding ring) for fabricating an article with a positive curvature (FIG. 3B1) or with a negative curvature (FIG. 3B2). FIG. 3C represents a support in a form of a binding frame positioned between two adjacent reservoirs.

FIG. 5 represents a comparison of experimental results (image within the liquid container) to the theoretical predictions (overlaid blue and red curves), for were $\Delta\rho=-6.5$ kg/mm$^3$, D=87.2 mm, $V_0$=48 ml, and $\gamma$=0.02 N/m yielding good agreement with no fitting parameters.

FIG. 6A: Neutral buoyancy conditions with $V_0 > V_{frame}$ result in positive and symmetric spherical lenses, where the lens curvature is dictated by the injected volume. FIG. 6B: Varying slightly the density of the immersion liquid for a fixed volume (here $V_0 > V_{frame}$) results in asymmetric spherical lenses. FIG. 6C: Neutral buoyancy conditions with $V_0 < V_{frame}$ result in negative and symmetric spherical lenses, where similarly to FIG. 6A, the optical the power can be controlled by the injected volume.

FIG. 7A is scheme illustrating the workflow for the fabrication of freeform optical articles using the fluid shaping method. (a) A binding frame with a desired azimuthal height variation is printed using a 3D printer. (b) The frame is sealed at its bottom using a flat window and positioned at the bottom of a larger container. (c) The inner part of the frame is filled with an optical liquid of volume V according to its design. (d) The container is filled with an immersion liquid of a density $\rho_{im}$ set by the desired Bond number. The immersion liquid volume is insignificant, as long as the frame and optical liquid are completely submerged. (e) The optical liquid is allowed to equilibrate and achieve its minimum energy state and is then illuminated with UV light to cure it. (f) The solid exemplary article can be removed from the immersion liquid. The frame and the immersion liquid can both be reused for the fabrication of additional exemplary articles. FIG. 7B is a schematic illustration depicting non-limiting binding frame geometries.

FIG. 8A is an image of the predicted 3D surface. FIG. 8B represents the curvature (optical power) distribution of an exemplary article. The power gradients are primarily located at the four corners.

FIG. 8C is an image of the 3D printed binding frame. FIG. 8D is an image of the solidified exemplary article within the frame. FIG. 8E is an image of the exemplary article mounted within a Thorlabs holder. FIG. 8F is an image of a circular reference object. FIG. 8G is an image of the same object, as visualized through the quatrefoil, showing the effect of the power gradients at the corner, transforming the circle into an approximate square.

FIG. 9A represents a plot of the error between the measured optical surface and the theoretical surface for three cross-sections 0°, 30°, 60°. The dashed line presents the error root-mean-square for the three lines, RMS=690 nm. FIG. 9B represents an AFM measurement of surface roughness of an exemplary quatrefoil optical lens, with RMS of less than 1 nm.

FIGS. 10A-F are illustration of an exemplary C-Frame. FIGS. 10A-B represent isometric and cross-section view of the C-Frame. FIGS. 10C-F are images representing liquid that upon injection into the frame fills first the peripheral channel, and then penetrates radially from all directions to fill the inner lumen, forming the liquid volume of the curable liquid defining an exemplary lens (curable liquid is dyed in blue for better contrast).

FIGS. 11A-I are non-limiting illustrations of an exemplary device of the invention. FIG. 11A represents CAD illustration of an exemplary device of the invention. FIGS. 11B-D illustrate an elastic binding frame (pointed by a line) placed into the exemplary device and connected to the lens liquid supply tube. FIGS. 11E-I: illustrate an exemplary lens fabrication flowchart. To deploy the lens, the chamber with the immersion liquid is raised such that the frame is fully submerged, and the frame is stretched to minimize its inner volume. The frame is initially filled with a small amount of the curable liquid to fully wet its inner surface. The frame is then relaxed to its desired shape to obtain the correct astigmatic correction, and the rest of the curable liquid is then injected. Finally, the LED light source may be turned on to solidify the curable liquid, resulting in the formation of a cured lens.

FIG. 12A is a schematic representation of a target imaged through the fabricated lens in real time, and based on the image obtained by the sensor, the control unit controls the actuator of a high-accuracy syringe to add or remove the curable liquid, until the predestined shape or curvature is formed. FIG. 12B-C are images representing a USAF 1951 target imaged through a liquid lens, and appears in focus only at the correct lens curvature (FIG. 12C).

DETAILED DESCRIPTION

Figure 1:
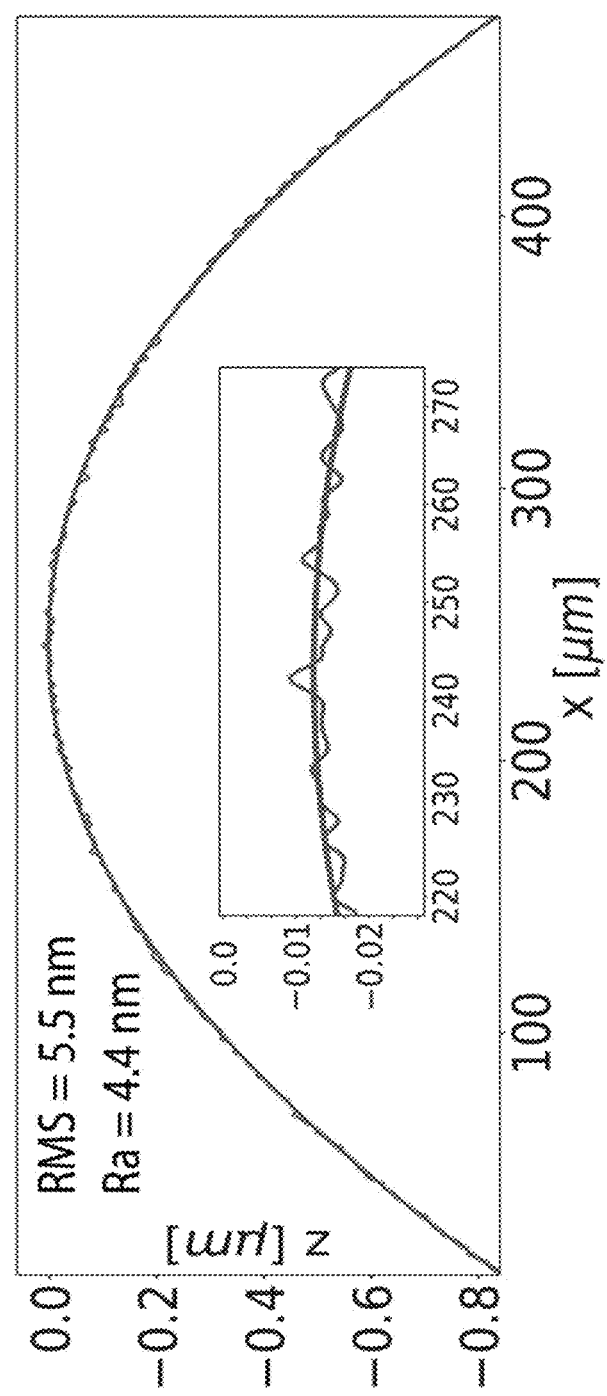
FIG. 1 is a microgram representing profile measurement of an exemplary spherical article of the invention.
Figure 2B:
FIGS. 2A-G are images of solid lenses produced using the fluidic shaping method.
Figure 2D:
Figure 2A:
Figure 2C:
Figure 2F:
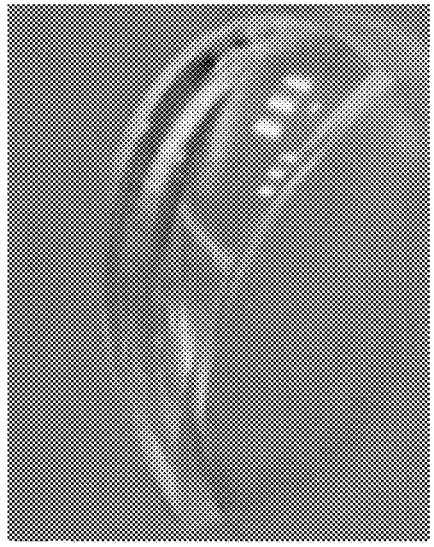
Figure 2E:
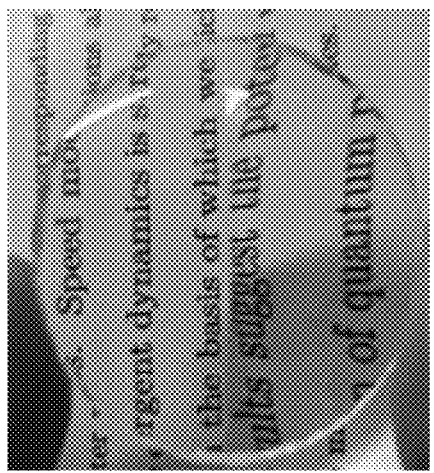
Figure 2G:

According to one aspect, there is provided a fabrication system comprising a chamber suitable for containing an immersion liquid; a port configured for transferring a curable liquid into the chamber and in contact with the support, wherein the port is adapted for being in fluid communication with a reservoir comprising the curable liquid; an actuator configured for being in operable communication with the reservoir; a support in operable communication with the port, wherein the support is configured for binding the curable liquid; a control unit configured to control the actuator to induce flow of the curable liquid towards the port, so as to provide a predetermined volume of the curable liquid in contact with or in close proximity to the support.

In some embodiments, there is provided a fabrication system comprising: a chamber suitable for containing an immersion liquid; a port adapted for being in fluid communication with a reservoir comprising a curable liquid; an actuator in operable communication with the reservoir and configured to induce flow of the curable liquid towards the port; a support in operable communication with the port, wherein the support is configured for binding the curable liquid; and a control unit configured to control the actuator to induce flow of a predetermined volume of the curable liquid towards the port, so as to provide the curable liquid in contact with the support; wherein the predetermined volume is sufficient for shaping an article comprising at least one surface with a pre-defined curvature.

In some embodiments, the support is configured to receive the curable liquid. In some embodiments, the support is capable retaining the curable liquid in contact with or bound thereto, for at least a time period sufficient for fabrication of the article, as described herein.

Chamber

In some embodiments, the fabrication system comprises a chamber having a dimension (e.g. length, depth, height) suitable for containing an immersion liquid, and wherein the volume of the immersion liquid is sufficient for immersion of at least one surface of the curable liquid. In some embodiments, the volume of the immersion liquid is sufficient for providing a buoyancy force to the curable liquid. In some embodiments, the volume of the immersion liquid is sufficient for contacting the at least one surface of the curable liquid. In some embodiments, the at least one surface is the upper surface of the curable liquid.

In some embodiments, the immersion liquid (e.g. an aqueous solution) is immiscible with the curable liquid, as described hereinbelow.

In some embodiments, the term "curable liquid" refers to one or more fluid(s) capable of undergoing hardening or solidification. In some embodiments, the terms "curable liquid" and "hardenable liquid" are used herein interchangeably. In some embodiments, the curable liquid is capable to undergo solidification, so as to result in a solid or a semi-solid. In some embodiments, the curable liquid is in a solid state upon hardening or solidification. In some embodiments, the curable liquid is capable to undergo solidification, so as to substantially reduce its flowability. In some embodiments, the curable liquid is or comprises a liquid. In some embodiments, the curable liquid comprises a liquid capable of undergo curing. In some embodiments, the curable liquid is in a liquid state. In some embodiments, the curable liquid comprises a liquid polymer. In some embodiments, the liquid polymer is curable. In some embodiments, the curable liquid comprises a curable polymer.

In some embodiments, the chamber comprises a heating element in operable communication with the control unit, wherein the heating element is configured for controlling a temperature of the immersion liquid.

In some embodiments, the chamber comprises an additional port suitable for controlling the volume of the immersion liquid. In some embodiments, the additional port is in operational communication with the control unit. In some embodiments, the additional port is configured for providing a predetermined volume of the immersion liquid into the chamber. In some embodiments, the additional port is configured for providing an additional liquid into the chamber, thereby controlling the density of the immersion liquid.

In some embodiments, the chamber comprises a first reservoir and a second reservoir suitable for containing the immersion liquid. In some embodiments the first reservoir and the second reservoir are configured to be in fluid communication with each other.

In some embodiments, the first reservoir is suitable for containing a first immersion liquid, and the second reservoir is suitable for containing a second immersion liquid. In some embodiments, the density of the first immersion liquid and of the second immersion liquid are the same or different.

In some embodiments, the first reservoir, the second reservoir or both further comprise an additional port in operable communication with an actuator. In some embodiments, the additional port is in fluid communication with the chamber. In some embodiments, the actuator in operable communication with the control unit is configured for controlling the volume of the immersion liquid within the first reservoir and/or the second reservoir via the additional port.

Port

In some embodiments, the fabrication system comprises a port configured for injecting of the curable liquid. In some embodiments, the port is configured for injecting of the curable liquid, so as to obtain a predetermined volume of the curable liquid in contact with or in close proximity to the support. In some embodiments, the port is in contact with or in close proximity to a support. In some embodiments, the port is configured for transferring a curable liquid on top or in close proximity to the support. In some embodiments, the port is configured for providing a curable liquid in contact with the support. In some embodiments, the port is shaped so as to enable flow of the curable liquid on top of the support. In some embodiments, the port is shaped so as to enable flow of the curable liquid into the lumen defined by the support (e.g. binding frame).

In some embodiments, the port is in operable communication with the support. In some embodiments, the port is in operable communication with the chamber. In some embodiments, the port is in fluid communication with the chamber. In some embodiments, the port is positioned within the chamber. In some embodiments, the port is n some embodiments, the port is in a form of a dispensing mechanism. In some embodiments, the port comprises a valve (e.g. injection valve). In some embodiments, the port comprises a plurality of ports.

In some embodiments, the port is in a fluid communication with a reservoir comprising the curable liquid and is configured for transferring or injecting the curable liquid from the reservoir into the chamber. In some embodiments, the port is in fluid communication with the reservoir via a channel. In some embodiments, the port is configured for controlling the volume of the curable liquid. In some embodiments, the port further comprises a backflow preventer, configured to prevent a backflow of the immersion liquid towards the reservoir.

In some embodiments, the port is in operable communication with the actuator. In some embodiments, the actuator is configured to induce a flow of the curable liquid from the reservoir into the chamber via the port. Optionally, the curable liquid is transferred by the actuator from the reservoir via the port towards the support.

In some embodiments, the device comprises a plurality of ports. In some embodiments, the plurality of ports are distributed or allocated at the perimeter of the support, so as to enable simultaneous injection of the curable liquid.

Support

In some embodiments, the support is a solid. In some embodiments, the support is configured to provide a physical support for the curable liquid. In some embodiments, the support is configured for receiving the curable liquid. In some embodiments, the support is configured to provide a physical support or bind the curable liquid, wherein the curable liquid in contact with or bound to the support defines the shape of the article of the invention. In some embodiments, at least one surface of the support is wettable by the curable liquid. In some embodiments, the affinity of the curable liquid to the support is sufficient for preventing separation of the curable liquid from the support. In some embodiments, the curable liquid has an affinity to the support greater than the affinity to the immersion liquid. In some embodiments, a contact angle of the curable liquid on top of the support is less than 90°.

In some embodiments, the support is in a form of a binding layer. In some embodiments, the support is in a form of a container. In some embodiments, at least one surface of the support is suitable for binding or adhering to the curable liquid.

Figure 3A:
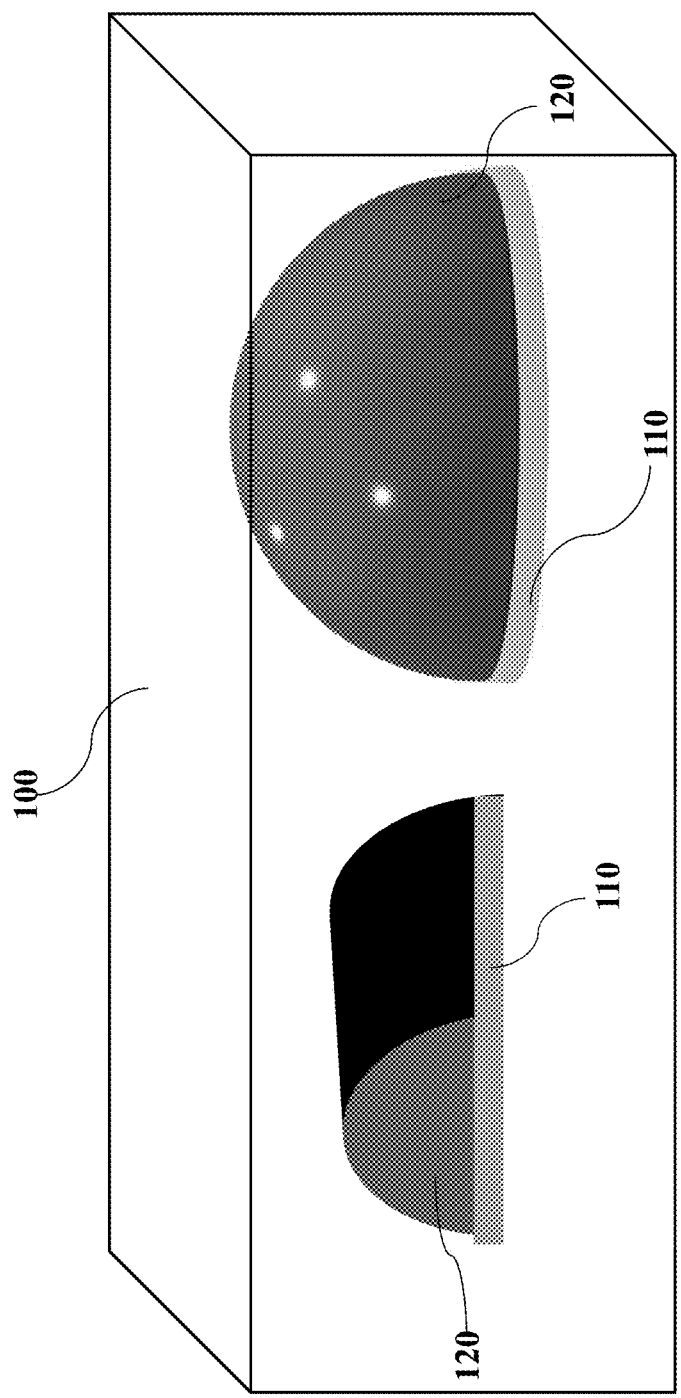

Reference is now made to FIG. 3A demonstrating a non-limiting configuration of an exemplary fabrication system.

The fabrication system may comprise a chamber 100 optionally filled with an immersion liquid. The fabrication system may comprise a support 110. The support 110 may be in a form of a binding layer. The support 110 may be configured for binding or adhering to the curable liquid 120.

In some embodiments, the support is in a form of a binding frame. In some embodiments, the binding frame has a circular or an elliptical shape. In some embodiments, the binding frame has a rectangular shape. In some embodiments, the binding frame is capable of binding at least a portion of the curable liquid. In some embodiments, the support (e.g. binding frame) defines a lumen. In some embodiments, the curable liquid bound to the support (e.g. binding frame) substantially fills the lumen (e.g. at least 70%, at least 80%, at least 90%, at least 95%, at least 99% of the lumen, including any range between). In some embodiments, the support is configured to bind or to enclose the curable liquid within the lumen, and wherein the curable liquid within the lumen substantially defines the shape of the article of the invention. In some embodiments, the binding frame is in contact with a port, wherein the port is an opening facing the lumen.

Reference is now made to FIGS. 3B1-2 demonstrating a non-limiting configuration of an exemplary fabrication system.

The fabrication system may comprise a chamber 200 optionally filled with an immersion liquid. The fabrication system may comprise a support 210 or 220 in a form of a binding frame. The support 210 or 220 may be configured for binding or adhering to the curable liquid 230. The support 210 or 220 may be in contact with the curable liquid 230, wherein the curable liquid substantially fills the lumen defined by the support 210 or 220. The support 210 may have a height sufficient for forming an article (e.g. lens) with a positive curvature, wherein the height of the support 220 is less than the height of the curable liquid. The support 220 may have a height sufficient for forming an article (e.g. lens) with a negative curvature, wherein the height of the support 220 is greater or equal to the height of the curable liquid. The fabrication system may comprise a port 240 on or within the support 210 or 220. The fabrication system may comprise a plurality of ports 240, e.g. located at the perimeter of the support 210 or 220.

In some embodiments, the support comprises a polymeric material. In some embodiments, the polymeric material comprises a cured polymer. In some embodiments, the polymeric material comprises a hydrophobic polymer. In some embodiments, the polymeric material comprises a lipophilic polymer.

In some embodiments, the polymeric material comprises a thermoset polymer. In some embodiments, the polymeric material comprises the same polymer as the curable liquid. In some embodiments, the polymeric material comprises a polymer characterized by a contact angle as described herein. In some embodiments, the polymer is characterized by a water contact angle of at least 95°, at least 100°, at least 110°, at least 120°, at least 130°, at least 140°, at least 150°, at least 1600 including any range between.

Non-limiting examples of polymers suitable for manufacturing the support include but are not limited to polydimethylsioloxane, polyacrylate, polyurethane, polycarbonate, polycaprolactone, polyamide, a cured photopolymer (e.g. Colorado photopolymer), a cured photo adhesive (e.g. NOA81), cured aliphatic polyester urethane acrylate oligomer, cured urethane (meth)acrylate resin, cured a (meth-)acrylate resin, cured a (meth-)acrylate amine oligomeric resin, a cured cycloaliphatic epoxy resin, a cured cyanate ester-based resin, a cured silicon polyurethane resin, and a dual cure resin (such as epoxy, silicon, etc.) or any combination thereof.

In some embodiments, a dimension of the support (e.g. height, diameter) is adapted for receiving a predetermined volume of the curable liquid. In some embodiments, a dimension of the support (e.g. height, diameter) is adapted for binding or enclosing a predetermined volume of the curable liquid. In some embodiments, the predetermined volume is sufficient for shaping an object with a predefined geometrical shape (e.g. a concaved lens). In some embodiments, the height of the binding frame is sufficient for supporting the predetermined volume of the curable liquid. In some embodiments, the height of the binding frame is substantially the same as the thickness of the article disclosed herein (e.g. a concaved lens), as illustrated by FIG. 3B2.

In some embodiments, the support is sufficiently stable for use in a fabrication process of the invention. In some embodiments, the support is sufficiently stable for use in a curing process. In some embodiments, the support has a sufficient mechanical and chemical stability (with response to parameters such as mechanical deformation, deformation due to thermal expansion, UV/vis radiation) to provide a support (e.g. frame or housing) for the curable liquid.

In some embodiments, the support is adjustable. In some embodiments, the support is deformable. In some embodiments, the support (e.g. a binding frame) is flexible. In some embodiments, the support (e.g. a binding frame) is expandable. In some embodiments, the support is capable of changing its geometrical shape or form (e.g. from a circular form into an elliptical form) in response to a trigger (e.g. a signal).

In some embodiments, the support is in operable communication with an expansion mechanism, wherein the expansion mechanism is construed so as to allow variation of the geometrical shape of the support (e.g. contraction and/or extension). In some embodiments, the support is in operable communication with an expansion mechanism, wherein the expansion mechanism is in operable communication with the control unit.

In some embodiments, the support is further equipped with a heating element and a controller in operable communication with the heating element and with the control unit. In some embodiments, the heating element is configured for heating the support to a predetermined temperature.

In some embodiments, the heating element is configured to control the temperature of the support. In some embodiments, the heating element is configured to control the temperature of the support and/or of the curable liquid in contact with the support. In some embodiments, the support is configured to control any of: the temperature, the cross-section and/or the curvature of the curable liquid in contact therewith.

In some embodiments, the support is in fluid communication with the chamber. In some embodiments, the support is configured for immersing the curable liquid in contact with or bound to the support (also referred to herein as an "uncured article"), within the immersion liquid. In some embodiments, the support is in fluid communication with the chamber. In some embodiments, the support is configured for immersing the uncured article within the immersion liquid. In some embodiments, the support is positioned within the chamber, so as to allow immersion of the uncured article (or at least a portion thereof) within the immersion liquid.

In some embodiments, the vertical and/or horizontal position of the support is adjustable (e.g. via the control unit). In some embodiments, the vertical and/or horizontal position of the support is adjustable so as to allow immersion of the uncured article, within the immersion liquid.

In some embodiments, the support is located between the first reservoir and the second reservoir. In some embodiments, an upper portion of the support faces the first reservoir; and a bottom portion of the support faces the second reservoir. In some embodiments, an upper portion of the support is in fluid communication with the first reservoir; and a bottom portion of the support is in fluid communication with the second reservoir. In some embodiments, an upper portion of the support faces the first immersion liquid; and a bottom portion of the support faces the second immersion liquid.

In some embodiments, the curable liquid has a contact angle with the support of less than 90°, less than 85°, less than 80°, less than 70°, less than 75°, less than 60°, less than 50°, less than 45°, less than 400 including any range therebetween. In some embodiments, the contact angle is a receding contact angle.

The actuator, as described herein may include a pump wherein fluid pressure inside the reservoir may be adjusted by pumping fluid (e.g. the immersion liquid and/or the curable liquid) into and/or out of the reservoir.

Figure 3C:
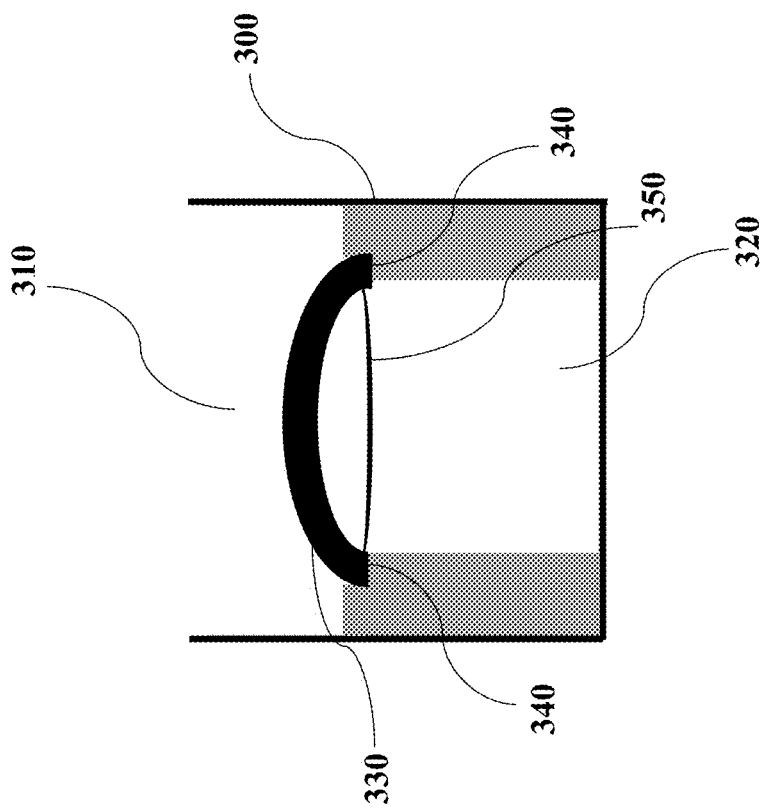
Figure 4:
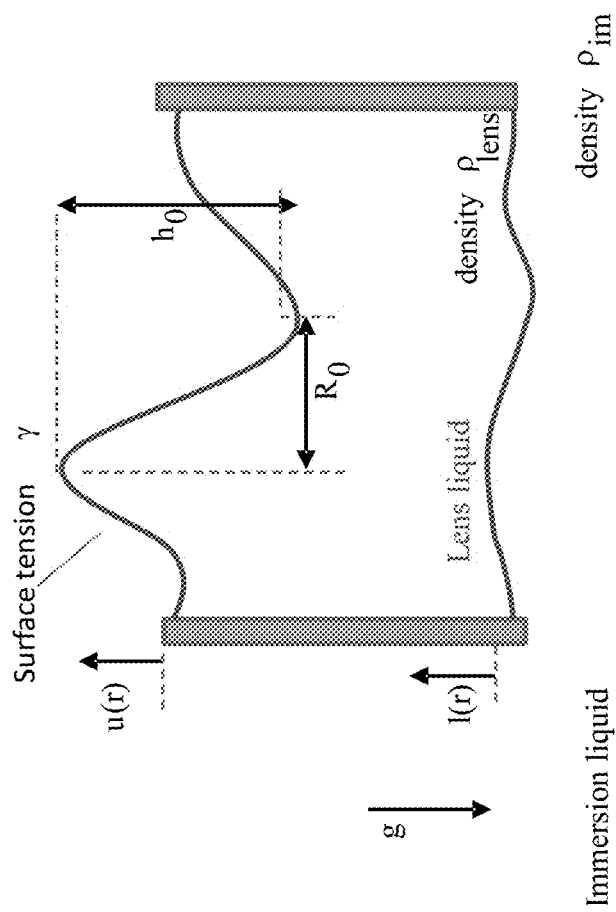
FIG. 4 presents a schematic illustration depicting surface specific parameters of an exemplary article of the invention.

Reference is now made to FIG. 3C demonstrating a non-limiting configuration of an exemplary fabrication system.

The system comprises a chamber 300. The chamber 300 may have a first reservoir 310 on top of the second reservoir 320. The first reservoir 310 and the second reservoir 320 may have an additional port in operable communication with an actuator configured to control the volume of the immersion liquid within the first reservoir 310 and/or within the second reservoir 320. The system may have a binding frame 350 positioned between the first reservoir 310 and the second reservoir 320. The binding frame 350 may be in operable communication with a port 340. The port 340 may be in liquid communication with a reservoir containing a curable liquid. The binding frame 350 may be bound to a curable liquid 330, thereby separating between the first reservoir 310 and the second reservoir 320. The upper surface of the curable liquid 330 (or a first surface of the uncured article) may face the first reservoir 310 and the lower surface of the curable liquid 330 (or a second surface of the uncured article) may face the second reservoir 320. In some embodiments, the first surface of the uncured article faces the first reservoir, and the second surface of the uncured article faces the second reservoir. In some embodiments, the first surface of the uncured article is in contact with the first immersion liquid, and the second surface of the uncured article is in contact with the second immersion liquid.

In some embodiments, the binding frame 350 bound to a curable liquid 330 may substantially prevent mixing of the first immersion liquid filling the first reservoir 310 and the second immersion liquid filling the second reservoir 320.

In some embodiments, the system as described herein is configured for manufacturing a cured polymeric article having at least one shapeable surface. In some embodiments, the system is for shaping or manufacturing an article having at least one surface with a predetermined curvature. In some embodiments, the system is for shaping or manufacturing an article having at least one surface with a curvature predetermined by any of: the volume of curable liquid in contact with the support (e.g. predetermined volume); the shape and/or a dimension of the support; the physical properties of the immersion liquid and curable liquid (e.g. viscosity, surface tension, density); the pressure and/or temperature within the reservoir.

In some embodiments, the system as illustrated by FIG. 3C is for manufacturing an article having two surfaces with a predetermined curvature. In some embodiments, the system as described by FIG. 3C is for manufacturing a lens having two surfaces with a predetermined curvature (e.g. a bi-convex, a bi-concave, a bi-focal, or a meniscus lens). In some embodiments, the system is for controlling the curvature and/or shape of any one of the optical surfaces of the lens.

Control Unit

In some embodiments, the system comprises a control unit in operable communication with the port, with the actuator and optionally with the support (e.g. adjustable support). In some embodiment, the control unit is further in operable communication with the curing element. In some embodiment, the control unit comprises an electronic circuitry unit. In some embodiments, the control unit is remotely controlled.

In some embodiments, the control unit is configured to control the actuator to induce flow of the curable liquid towards the port. In some embodiments, the control unit is configured to control the actuator, so as to induce flow of the curable liquid from the reservoir towards the support via one or more ports. In some embodiments, the control unit is configured to control flow of the liquid. In some embodiments, the control unit is configured to control flow capacity (e.g. flow capacity of the one or more ports).

In some embodiments, the control unit is configured to control a dimension (e.g. cross section and/or geometrical shape) of the support. In some embodiments, the control unit is configured to control a configuration of the support via the expansion mechanism.

In some embodiments, the control unit is configured to calculate a volume of the immersion liquid. In some embodiments, the control unit is configured to calculate a volume of the curable liquid sufficient for fabrication of the article under buoyancy conditions (e.g. the uncured article is immersed within the immersion liquid), wherein the article is characterized by a predetermined curvature. In some embodiments, the control unit is configured to calculate a volume of the curable liquid sufficient for fabrication of the article under buoyancy conditions, wherein the article is characterized by a predetermined geometrical shape or and a predetermined dimension (e.g. diameter or cross-section). In some embodiments, a volume of the curable liquid is the predetermined volume.

In some embodiments, the control unit is configured to calculate the predetermined volume of the curable liquid based on buoyancy induced by the immersion liquid (see equation 2.3 below). In some embodiments, the control unit is configured to determine the pre-defined curvature of the article (e.g. an uncured article or a cured article) based on buoyancy induced by the immersion liquid. In some embodiments, the control unit is configured to calculate the buoyancy based on the density of the immersion liquid and on the density of the curable liquid, and optionally based on the viscosity and/or surface tension of the curable liquid. In some embodiments, the control unit is further configured to calculate a gravitational force exerted on the curable liquid.

In some embodiments, the control unit is configured to i) receive a pre-defined curvature of the article; and (ii) control the actuator so as to induce flow of the curable liquid towards the support, according to the received pre-defined curvature. In some embodiments, the control unit is configured to induce flow of the predetermined volume of the curable liquid, according to the received pre-defined curvature.

In some embodiments, the system is configured to control the curvature of the article, wherein the system comprises the chamber, comprising a first reservoir and a second reservoir and the support (e.g. binding frame) located between the first reservoir and the second reservoir; wherein the control unit is configured to receive a pre-defined curvature of the first surface of the article facing the first reservoir and of the second surface of the article facing the second reservoir; and wherein the control unit is further configured to control at least one of: (i) a volume, and (ii) a density of the immersion liquid within the first reservoir and/or within the second reservoir, according to the received pre-defined curvature of the article. In some embodiments, the control unit is configured to control a pressure within the first reservoir and/or within the second reservoir according to the received pre-defined curvature of the article.

In some embodiments, the control unit comprises at least one hardware processor; and a non-transitory computer-readable storage medium having stored thereon program instructions, the program instructions executable by the at least one hardware processor to: receive data comprising (i) a buoyancy induced by the immersion liquid (e.g. according to equation 2.3 below), (ii) a dimension (e.g. cross-section and height) of the support; and to calculate the curvature of the article based on the received data.

In some embodiments, the control unit comprises at least one hardware processor; and a non-transitory computer-readable storage medium having stored thereon program instructions, the program instructions executable by the at least one hardware processor to: receive a predefined curvature of the article and to receive data comprising (i) a buoyancy induced by the immersion liquid (e.g. according to equation 2.3 below), (ii) a dimension (e.g. cross-section and height) of the support; and wherein the control unit is further configured to control the actuator to induce flow of the curable liquid based on the received data and according to the received pre-defined curvature of the article.

Fabricated Articles

According to one aspect there is provided an article comprising a cured polymer, wherein the article comprises a first surface characterized by (i) route mean square of surface height (RMSh) being less than 10 nm and by (ii) standard deviation of the RMSh being less than 1 nm.

In some embodiments, the article is a cured article, wherein cured is as described herein. In some embodiments, the article comprises a cured polymer. In some embodiments, the polymer is at least partially cured. In some embodiments, at least 80%, at least 85%, at least 90%, at least 92%, at least 95%, at least 97%, at least 98%, at least 99%, at least 99.9% of the article comprises a cured polymer, including any range between. In some embodiments, the article is a polymeric article. In some embodiments, the article is a cured polymeric article. In some embodiments, the cured polymer is substantially homogenous.

In some embodiments, the polymer utilized for the fabrication of the article is a curable polymer, as described herein. In some embodiments, the polymer utilized for the fabrication of the article is a hydrophobic polymer. In some embodiments, the polymer utilized for the fabrication of the article is a water-immiscible polymer, as described herein.

In some embodiments, the article is a solid. In some embodiments, the article is a solid at a temperature below the melting point of the cured polymer. In some embodiments, the article is a solid at a temperature of less than 300° C., less than 280° C., less than 260° C., less than 240° C., less than 220° C., less than 200° C., less than 180° C., less than 150° C., less than 100° C., less than 50° C., less than 40° C., including any range or value therebetween.

In some embodiments, the article is substantially stable at a temperature below the melting point of the cured polymer. In some embodiments, the article is substantially stable at a temperature of less than 300° C., less than 280° C., less than 260° C., less than 240° C., less than 220° C., less than 200° C., less than 180° C., less than 150° C., less than 100° C., less than 50° C., less than 40° C., including any range or value therebetween.

As used herein the term "stable" refers to the capability of the article to maintain its structural and/or mechanical integrity. In some embodiments, the composition is referred to as stable, if the composition is characterized by a sufficient mechanical integrity under operable conditions. In some embodiments, operable conditions comprise UV-visible light irradiation, a thermal exposure to a temperature of at most 70° C., at most 60° C., at most 50° C., at most 40° C., at most 30° C., including any range or value therebetween. In some embodiments, the stable article is chemically inert under operable conditions. In some embodiments, the stable article is rigid under operable conditions.

In some embodiments, the article is compatible with any optical device. In some embodiments, the article is compatible with any known light source.

In some embodiments, the cured article is substantially inert (i.e., non-reactive) to light irradiation. In some embodiments, the cured article is substantially inert to UV radiation. In some embodiments, the cured article is substantially inert to UV and/or visible light radiation.

In some embodiments, the article is substantially non-curable or does not polymerize upon exposure to UV and/or visible light radiation. In some embodiments, the article is substantially non-curable or does not polymerize upon exposure to a thermal radiation.

In some embodiments, the cured article comprises chemical species having an unsaturated moiety in an amount of less than 10% by weight, of less than 5% by weight, less than 1% by weight, less than 0.5% by weight, less than 0.1% by weight, based on the total weight of the composition.

In some embodiments, the cured article comprises chemical species capable of thermal curing in an amount of less than 10% by weight, of less than 5% by weight, less than 1% by weight, less than 0.5% by weight, less than 0.1% by weight, based on the total weight of the composition, wherein the chemical species capable of thermal curing is as described herein.

In some embodiments, the article or the cured article is in a form of a cured polymeric layer. In some embodiments, the article or the cured article comprises one layer. In some embodiments, the article or the cured article comprises a plurality of layers.

In some embodiments, the article or the cured article comprises a first surface characterized by (i) route mean square of surface height (RMSh) being less than 10 nm and by (ii) standard deviation of the RMSh being between 0.1 and 10%, and a second surface.

In some embodiments, at least one surface of the article of the invention is substantially free of surface defects (e.g. scratches, tears, or abrasion trails). In some embodiments, at least one surface of the article of the invention is substantially free of surface defects originating from one or more polishing method (e.g. methods of lens polishing). In some embodiments, at least one surface of the article of the invention has at most 20%, at most 10%, at most 5%, at most 3%, at most 1%, at most 0.1%, at most 0.01%, at most 0.001%, of surface defects originating from one or more polishing method, including any range between; as compared to a polished article (e.g. lens) having the same surface area.

In some embodiments, at least one surface of the article of the invention is characterized by RMSh less than 10 nm, less than 8 nm, less than 7 nm, less than 6 nm, less than 5 nm, less than 4 nm, less than 2 nm, less than 1 nm, less than 0.5 nm, including any range or value therebetween. In some embodiments, at least one surface of the article of the invention is characterized by RMSh of between 0.5 and 10 nm, between 0.5 and 1 nm, between 1 and 2 nm, between 2 and 4 nm, between 4 and 10 nm, including any range or value therebetween.

In some embodiments, at least one surface of the article of the invention is characterized by standard deviation of the RMSh being between 0.1 and 10%, between 0.1 and 0.5%, between 0.5 and 1%, between 0.1 and 1%, between 1 and 5%, between 5 and 10%, including any range between. In some embodiments, the entire surface of the article is substantially characterized by standard deviation of the RMSh being between 0.1 and 10%, between 0.1 and 0.5%, between 0.5 and 1%, between 0.1 and 1%, between 1 and 5%, between 5 and 10%, including any range between.

In some embodiments, at least 80%, at least 85%, at least 90%, at least 95%, at least 97%, at least 99%, at least 99.9%, of the entire surface (e.g. at least one surface, such as the first surface) is characterized by any of (i) RMSh of between 0.5 and 10 nm, between 0.5 and 1 nm, between 1 and 2 nm, between 2 and 4 nm, between 4 and 10 nm, including any range or value therebetween; (ii) by standard deviation of the RMSh being between 0.1 and 10%, between 0.1 and 0.5%, between 0.5 and 1%, between 0.1 and 1%, between 1 and 5%, between 5 and 10%, including any range between; or both (i) and (ii).

In some embodiments, the RMSh of the first surface is less than 10 nm, less than 8 nm, less than 7 nm, less than 6 nm, less than 5 nm, less than 4 nm, less than 2 nm, less than 1 nm, less than 0.5 nm, including any range or value therebetween.

As used herein, the term RMSh (or RMS) refers to the arithmetic average of the absolute values of the profile height deviations from the mean line (i.e. surface aberrations), recorded within the evaluation length. RMS is calculated according to formula 1:

$$\text{RMS} = \sqrt{\frac{1}{N}\sum_{i=1}^{N} Z_i^2},$$

wherein $Z_i$ is the difference between the height and the zero baseline.

The term "roughness" as used herein relates to the irregularities in the surface texture (i.e. surface aberrations). Irregularities are the peaks and valleys of a surface. Roughness of a surface can be determined by Scanning Electron Microscope (SEM).

In some embodiments, the first surface is characterized by a substantially constant RMSh. In some embodiments, the first surface is characterized by a substantially constant profile of surface heights. In some embodiments, the first surface is characterized by a substantially constant height of a plurality of surface aberrations. In some embodiments, at least 80%, at least 85%, at least 90%, at least 92%, at least 95%, at least 96%, at least 97%, at least 98%, at least 99% of the first surface is characterized by a substantially constant RMSh. In some embodiments, the first surface is substantially homogenous.

As used herein, the terms "substantially constant RMSh" or "substantially homogenous surface" are referred to the standard deviation of the RMSh (SD RMS) within the entire surface being at most 10%, at most 8%, at most 5%, at most 3%, at most 2%, at most 1%, at most 0.5%, at most 0.1% including any range or value therebetween.

In some embodiments, the SD RMS within at least 80%, at least 85%, at least 90%, at least 92%, at least 95%, at least 96%, at least 97%, at least 98%, at least 99% of the first surface is between 0.1 and 10%, between 0.1 and 0.5%, between 0.5 and 1%, between 1 and 3%, between 1 and 5%, between 5 and 10%, between 5 and 7%, between 7 and 10% including any range or value therebetween.

In some embodiments, the aberration profile of the first surface is characterized by a periodicity. In some embodiments, the first surface is substantially isotropic.

As used herein the term isotropic surface refers to a surface characterized by substantially the same surface roughness, independent on an analysis direction. For example, isotropic surface of a spherical article (e.g. the article of the invention) is characterized by substantially the same surface roughness measured along the lateral or along the radial direction of the spherical article. An example of a surface having an anisotropic roughness is a lens fabricated by mechanical means (e.g., grinding, machining and polishing) exhibiting non-uniformly distributed surface height values (such as lateral-, radial cracks). Furthermore, the isotropic surface may be defined by maximum peak-to-valley height ($SR_{max}$ ISO). $SR_{max}$ ISO is defined as the vertical distance between the top of the highest peak and the bottom of the deepest valley within the sampling length. It is the maximum of all the peak-to-valley values. $SR_{max}$ ISO measurement techniques are well-known in the art.

In some embodiments, the article of the invention further comprises a second surface characterized by (i) route mean square of surface height (RMSh) being less than 10 nm, less than 5 nm, or less than 1 nm; and by (ii) standard deviation of the RMSh (SD RMS) being between 0.1 and 10%, between 0.1 and 0.5%, between 0.5 and 1%, between 0.1 and 1%, between 1 and 5%, between 5 and 10%, including any range between.

In some embodiments, the RMSh of the second surface is as described herein for the first surface. In some embodiments, the RMSh of the second surface and of the first surface is substantially the same.

In some embodiments, the SD RMS of the second surface is as described herein for the first surface. In some embodiments, the SD RMS of the second surface and of the first surface is substantially the same.

In some embodiments, the first surface, the second surface or both are curved surfaces. In some embodiments, the first surface, the second surface or both are independently characterized a positive or by a negative curvature. In some embodiments, the article comprises the first surface having a positive curvature and the second surface having a negative curvature. In some embodiments, the article comprises the first surface having a negative curvature and the second surface having a positive curvature.

In some embodiments, the first surface, the second surface or both are characterized a constant mean curvature. In some embodiments, at least 80%, at least 85%, at least 90%, at least 92%, at least 95%, at least 96%, at least 97%, at least 98%, at least 99% of the first surface and/or of the second surface is characterized a constant mean curvature. In some embodiments, a standard deviation of the constant mean curvature is between 0.01 and 10%, between 0.01 and 0.05%, between 0.05 and 0.1%, between 0.1 and 0.5%, between 0.5 and 1%, between 1 and 3%, between 1 and 5%, between 5 and 10%, between 5 and 7%, between 7 and 10% including any range or value therebetween.

As shown by FIG. 1, standard deviation of the lens mean curvature is about 0.5%.

In some embodiments, the article of the invention is a lens. In some embodiments, the lens has at least one optical surface. In some embodiments, the lens has a plurality of optical surfaces. In some embodiments, the first surface and/or the second surface of the article is an optical surface.

In some embodiments, the article of the invention comprises a plurality of layers. In some embodiments, the article comprises a first layer comprising a substrate, and a second layer comprising the cured polymer of the invention having an outer surface as described herein. In some embodiments, the cured polymer of the invention is in a from of a coating on top of a substrate. Such coating may be utilized so as to obtain an article with a predefined surface roughness and/or curvature, as described therethrough.

In some embodiments, the lens diameter is predefined by the diameter of the uncured curable liquid utilized for the manufacturing of the lens, as described hereinbelow.

In some embodiments, the surface height of the lens (or lens height) is substantially greater than the capillary length of the uncured curable liquid. In some embodiments, the lens height is at least 1.5 times, at least 2 times, at least 3 times, at least 4 times, at least 5 times, at least 7 times, at least 8 times, at least 10 times greater than the capillary length of the uncured curable liquid, including any range between.

In some embodiments, the lens height is at least 4 mm, at least 6 mm, at least 8 mm, at least 10 mm, at least 12 mm, at least 15 mm, at least 20 mm, at least 30 mm, at least 40 mm, at least 50 mm, at least 60 mm, at least 70 mm, at least 80 mm, at least 90 mm, at least 100 mm, including any range between.

In some embodiments, the lens height is predetermined by (i) the volume of the uncured curable liquid, and (ii) by the difference between the density of the immersion liquid and the density of the uncured curable liquid, as described herein.

In some embodiments, the surface height of the lens (or lens height) is as described hereinbelow.

In some embodiments, the lens has at least one optical surface having a positive or a negative curvature. In some embodiments, the lens has two optical surfaces.

In some embodiments, the two optical surfaces are in contact with each other at the perimeter of the lens. In some embodiments, the perimeter of the lens is characterized by a vertical rim. In some embodiments, the lens has an upper optical surface and a lower optical surface, independently characterized a positive or by a negative curvature.

In some embodiments, the optical surface of the lens is characterized by a constant mean curvature, as described hereinabove. In some embodiments, the optical surface of the lens is characterized by the RMSh and the SD RMS, as described hereinabove for the first surface. In some embodiments, the optical surface of the lens has (i) a constant mean curvature, and (ii) is isotropic. In some embodiments, the optical surface of the lens has (i) a constant mean curvature, and (ii) the RMSh and the SD RMS as described hereinabove.

In some embodiments, at least one surface of the article (e.g. lens) has a non-spherical or a non-cylindrical surface, wherein the at least one surface is characterized by Equation 1.

$$\frac{r^2 h_{rr}\left(1 + \frac{1}{r^2}h_\theta^2\right) + (rh_r + h_{\theta\theta})(1 + h_r^2) - 2h_\theta h_r h_{r\theta} + \frac{2}{r}h_r h_\theta^2}{\left(1 + h_r^2 + \frac{1}{r^2}h_\theta^2\right)^{3/2}} = \pm(Ah + B)r^2,$$

wherein r represents a normalized radius variable, h represents a normalized surface height variable, subscripts denote spatial derivatives of h with respect to the radial or azimuthal directions, and A and B are free parameters. In some embodiments, at least one optical surface of the lens is characterized by Equation 1. In some embodiments, each point on the at least one surface is characterized by Equation 1, wherein A and B are surface specific constants.

As used herein, the term "surface height" is defined as the vertical distance between the highest point and the lowest point on the surface of the article. As used herein, the term "radius" is defined as the horizontal distance between the highest point and the lowest point on the surface of the article. In some embodiments, the surface is the optical surface of the lens.

In a non-limiting illustration, there is a lens liquid of density $\rho_{lens}$ injected into a cylindrical frame of radius $R_0$ and height d, suspended in an immersion liquid of density $\rho_{im}$. We assume that the lens liquid wets the inner walls of the cylinder and forms two separate interfaces with the immersion liquid, namely, an upper surface $u(r,\theta)$ and a lower surface $l(r,\theta)$ (see FIG. 1). The shape of these surfaces is determined by the balance of surface tension and gravitational forces, which can be characterized by the Bond number $$Bo = \frac{R_0^2}{\ell_c^2} = \frac{|\rho|gR_0^2}{\gamma}, \text{ where } \ell_c = \sqrt{\frac{\gamma}{|\rho|g}}$$

is the capillary length, $\rho = \rho_{lens} - \rho_{im}$ is the density difference, $\gamma$ is the interfacial energy between the two liquids, and g is earth gravity directed in the negative $\hat{z}$ direction. For Bo<<1, surface forces dominate over gravity, and both surfaces take the shape of a spherical caps. For Bo>>1, gravity dominates over surface forces, rendering the configuration unstable and precluding the emergence of steady-state solutions. A parameter domain for which Bo≈1, i.e., when gravitational forces and surface forces are of comparable importance should be considered.

The upper and lower surfaces can be described by minimizing the free energy functional:

$$\Pi = \gamma \int_0^{2\pi} \int_0^{R_0} F(r,\theta) dr d\theta \quad \text{(Equation 1.1)}$$

under the constraint of constant volume of the lens liquid, where $$F(r,\theta) = \left(\sqrt{1 + \left(\frac{du}{dr}\right)^2 + \frac{1}{r^2}\left(\frac{du}{d\theta}\right)^2} + \sqrt{1 + \left(\frac{dl}{dr}\right)^2 + \frac{1}{r^2}\left(\frac{dl}{d\theta}\right)^2} + \frac{\rho g}{2\gamma}(u^2 - l^2) + \frac{\lambda}{\gamma}(u - l)\right)r. \quad \text{(Equation 1.2)}$$

The first three terms under the integral sign represent the surface energy and the gravitational potential energy, respectively, while the last term represents the volume constraint, with a Lagrange multiplier $\lambda$.

An equilibrium is attained when the first variation of energy potential vanishes, i.e., $\delta\Pi=0$, which yields the standard Euler-Lagrange equations $$\begin{cases} \frac{\partial F}{\partial u} - \frac{d}{dr}\frac{\partial F}{\partial u_r} - \frac{d}{d\theta}\frac{\partial F}{\partial u_\theta} = 0 \\ \frac{\partial F}{\partial l} - \frac{d}{dr}\frac{\partial F}{\partial l_r} - \frac{d}{d\theta}\frac{\partial F}{\partial l_\theta} = 0 \end{cases}, \quad \text{(Equation 1.3)}$$

which can be written explicitly as $$\begin{cases} \left(\frac{\rho g}{\gamma}u + \frac{\lambda}{\gamma}\right)r^2 - \frac{r^2 u_{rr}\left(1 + \frac{1}{r^2}u_\theta^2\right) + (ru_r + u_{\theta\theta})(1 + u_r^2) - 2u_\theta u_r u_{r\theta} + \frac{2}{r}u_r u_\theta^2}{\left(1 + u_r^2 + \frac{1}{r^2}u_\theta^2\right)^{3/2}} = 0 \\ \left(-\frac{\rho g}{\gamma}l + \frac{\lambda}{\gamma}\right)r^2 - \frac{r^2 l_{rr}\left(1 + \frac{1}{r^2}l_\theta^2\right) + (rl_r + l_{\theta\theta})(1 + l_r^2) - 2l_\theta l_r l_{r\theta} + \frac{2}{r}l_r l_\theta^2}{\left(1 + l_r^2 + \frac{1}{r^2}l_\theta^2\right)^{3/2}} = 0 \end{cases} \quad \text{(Equation 1.4)}$$

Next, following normalized variables are defined as follows:

$$R = r/R_0, \Theta = \theta, U(R,\Theta) = u(R,\Theta)/h_0, \quad \text{(Equation 1.5)}$$

$$L(R,\Theta) = l(R,\Theta)/h_0, P_0 = \frac{\lambda h_0}{\gamma \varepsilon^2}$$

wherein $h_0$ is the characteristic deformation length scale and $$\varepsilon = \left(\frac{h_0}{R_0}\right)^2 \ll 1.$$

Upon substituting the variables in Equation 1.4 by normalized variables, Equation 1.6 is obtained:

$$R^2 U_{RR}\left(1 + \frac{\varepsilon}{R^2}U_\Theta^2\right) + (RU_R + U_{\Theta\Theta})(1 + \varepsilon U_R^2) - \frac{2\varepsilon U_\Theta U_R U_{R\Theta} + \frac{2}{r}h_r h_\theta^2}{R^2\left(1 + \varepsilon U_R^2 + \frac{\varepsilon}{R^2}U_\Theta^2\right)^{3/2}} + BoU = P_0. \qquad \text{(Equation 1.6)}$$

Equation 1.6 and Equation 1 are equivalent. For given (e.g., measured) surfaces U, L and a fixed value of the dimensionless number Bo, $P_0$ is determined by Equation 1.6. For surfaces created by means of the method of the invention, there exists a value of Bo such that $P_0$ remains constant while R and Θ are varied through their domain of definition. If, on the other hand, the surfaces have been created via a different method, varying R and Θ will change the value of $P_0$ regardless of the value of Bo. A reasonable range for the value of Bo is between 0 and 100.

Figure 5:
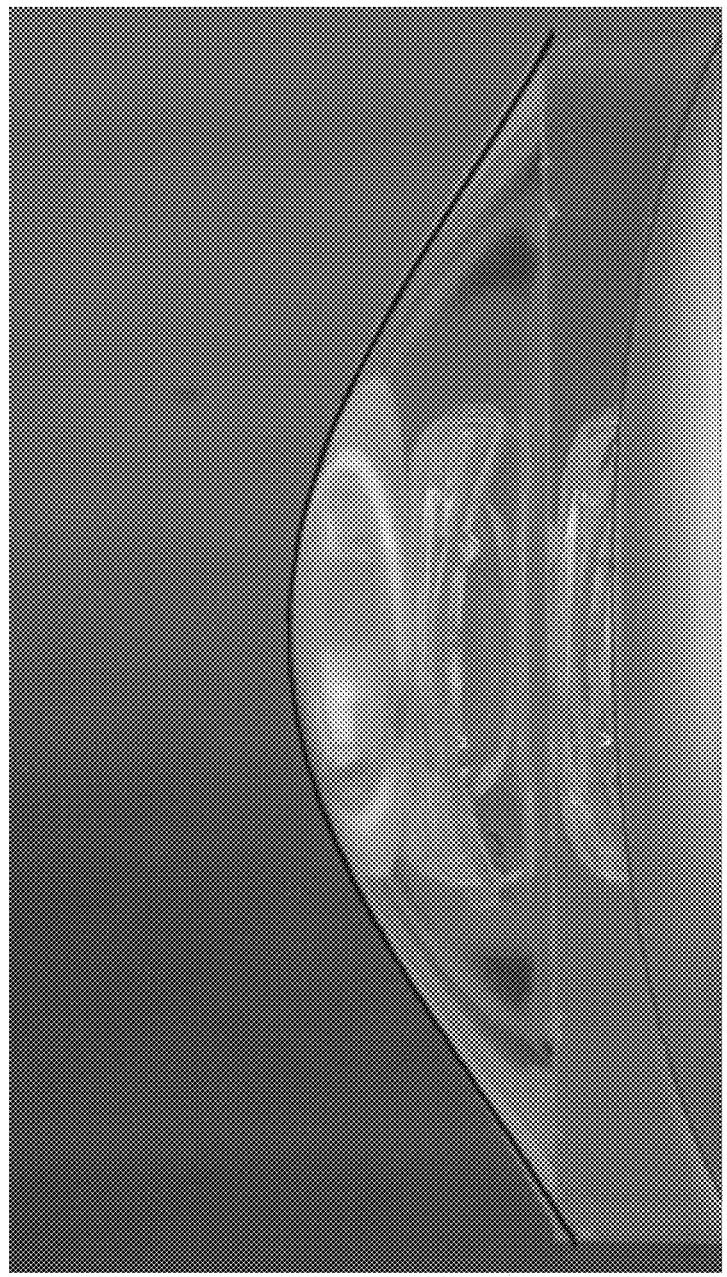
FIG. 5 is an image presenting an exemplary article of the invention having a non-spherical surface.

An exemplary article having a non-spherical surface defined by the Equation 1 or by the Equation 1.6 is represented by FIG. 5.

In some embodiments, the lens has an optical axis. In some embodiments, the lens has a predetermined focal length.

In some embodiments, the lens is substantially transparent in a UV-Vis and/or IR range. In some embodiments, the lens is substantially transparent in a range between 150 and 2000 nm, between 150 and 200 nm, between 200 and 300 nm, between 300 and 400 nm, between 400 and 500 nm, between 500 and 600 nm, between 600 and 700 nm, between 700 and 800 nm, between 800 and 1000 nm, between 700 and 1000 nm, between 1000 and 1500 nm, between 1000 and 1300 nm, between 1300 and 1500 nm, between 1500 and 2000 nm, between 1500 and 1700 nm, including any range or value therebetween.

In some embodiments, the lens of the invention is devoid of a mechanical fabrication.

In some embodiments, the lens is characterized by a spherical, or by a non-spherical shape or geometry. In some embodiments, the lens is in a form of a sphere or a hemisphere. In some embodiments, the lens is selected from a plano-convex, a plano-concave, a bi-convex, a bi-concave, a bi-focal, a meniscus lens or a combination thereof.

In some embodiments, the article of the invention (e.g. a lens) comprises the first polymeric layer in contact with at least one additional layer. In some embodiments, the at least one additional layer is polymeric layer. In some embodiments, the article comprises a plurality of layers, wherein each layer comprises a different polymer. In some embodiments, the article (e.g. a lens) is a multilayer article, comprising plurality of polymers, wherein each polymer has a different refractive index. In some embodiments, the plurality of polymers are at least partially cured.

In some embodiments, the article is a solid comprising the cured polymer, wherein the cured polymer is as described herein.

In some embodiments, the optical surface of the lens comprises a plurality of regions having different curvatures. In some embodiments, the plurality of regions comprises the same cured polymer. In some embodiments, the plurality of regions are characterized by the same refractive index. In some embodiments, the optical surface of the lens comprises a plurality of regions having different focal lengths.

In some embodiments, the lens of the invention is a bifocal lens. In some embodiments, the bifocal lens has at least one optical surface having a plurality of regions with different focal lengths.

In some embodiments, the article (e.g. lens) is substantially devoid of a metal particle. In some embodiments, the lens is substantially devoid of a magnetic particle. In some embodiments, the lens of the invention is devoid of a mechanical fabrication (e.g. polishing). In some embodiments, the lens of the invention is a non-mechanically fabricated lens. In some embodiments, the lens of the invention is manufactured by the fabrication process of the invention, as described herein.

In some embodiments, the optical surface of the lens has a non-spherical form. In some embodiments, the optical surface of the lens is characterized by a varying curvature. In some embodiments, the lens of the invention comprises a positive spherical lens, a negative spherical lens, a cylindrical lens, or a saddle lens. Exemplary lenses are represented by FIGS. 2 and 6.

In an exemplary embodiment, a liquid lens of density $\rho_{lens}$, pinned by a circular frame of radius a and height H, is suspended in an immiscible immersion liquid of density $\rho_{im}$. Assuming that the difference in densities is small enough such that the Bond number is sufficiently small, $B_0 = a^2/\ell_c^2 \ll 1$, where, $\ell_c = \sqrt{\gamma/\Delta\rho g}$, is the capillary length, where $\Delta\rho = \rho_{lens} - \rho_{im}$ and g is Earth's gravity. Under this assumption, surface tension forces dominate, and the interfaces between the two fluids assume the shape of a spherical caps with an upper radius $R_{up}$ and a lower radius $R_{low}$. The volume of the liquid lens is assumed to be $V_0$ and is equal to the sum of the volumes of the two caps and the cylinder enclosed in the binding frame. If one of the surfaces has a negative curvature, i.e., the cap curves inwards (toward the frame, see FIG. 6C), its volume will be negative as well. Defining $h_{low}$ and $h_{up}$ as the height of the spherical cap relative to the fame edge, the lens volume can be expressed by Equation 2.1:

$$V_0 = V_{up} + V_{low} + V_{frame} = \frac{\pi}{6}\left(3a^2(h_{up} + h_{low}) + h_{up}^3 + h_{low}^3\right) + \pi a^2 H,$$

wherein $h_j$ is related to $R_j$ through $(a^2+h_j^2)/2h_j = R_j$.

The two forces acting on the suspended lens liquid are the surface tension $F_{\gamma,j} = 2\pi\gamma(a^2+h_j^2)/R_j$, and the gravitational force $F_g = -\Delta\rho g V_{lens}$, which must balance each other, $$\Delta h = h_{up} - h_{low} = \frac{V_0}{4\pi \ell_c^2}, \qquad \text{(Equation 2.2)}$$

Substituting Equation 2.2 into Equation 2.1, Equation 2.3 is obtained:

$$V_0 = \frac{\pi}{6}\left[2h_{low}^3 + 3\Delta h(h_{low}^2 + a^2) + (3\Delta h^2 + 6a^2)h_{low} + \Delta h^3\right] + \pi a^2 H \quad \text{(Equation 2.3)}$$

Prescribing desired spherical radii R_up and R_low sets the values of h_up and h_low and yields a unique solution for the volume of the lens. Equation (2.2) can be used to obtain the capillary length and thus the required density difference.

In some embodiments, the control unit is configured to control the temperature of any of the heating elements, thereby controlling the temperature of the immersion liquid, and/or of the support.

Optionally, the disclosed system further comprises a computer program product.

Optionally, the computer program product comprises a computer-readable storage medium. The computer-readable storage medium may have program code embodied therewith. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to drawings and/or diagrams of methods, apparatus (systems), and computer program products according to embodiments of the invention. It will be understood that each illustration and/or drawing, and combinations thereof, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the drawings. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the drawings.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the drawings.

In some embodiments, the program code is excusable by a hardware processor.

In some embodiments, the hardware processor is a part of the control unit.

In some embodiments, there is further provided a read-out of the assay carried out in the disclosed system or device may be detected or measured using any suitable detection or measuring means known in the art. The detection means may vary depending on the nature of the read-out of the assay. For example, for assays providing a fluorescent read-out, the detection means may include a source of fluorescent light at an appropriate wavelength to excite the fluorophores in the reaction sites and means detect the emitted fluorescent light at the appropriate wavelength. The excitation light may be filtered using a bandwidth filter before the light is collimated through a lens. The same (e.g., Fresnel) lens may be used for focusing the illumination and collection of the fluorescence light. Another lens may be used to focus the fluorescent light onto the detector surface (e.g., a photomultiplier-tube). Fluorescent read-outs may also be detected using a standard fluorescent microscope fitted with a CCD camera and software. In some embodiments, disclosed system also relates to an apparatus including the device in any embodiments thereof, and a detection means as described herein.

In some embodiments, the system further comprises a light source. In some embodiments, the light source is in operable communication with the control unit. In some embodiments, the light source is configured to emit light at a suitable wavelength (e.g. in the UV-range). In some embodiments, the light source is a UV-light source, configured to emit UV-light at a suitable wavelength and having an intensity sufficient for curing the curable liquid. In some embodiments, the light source is configured for being in optical communication with the curable liquid. In some embodiments, the control unit is configured to control the intensity of the UV-light source. In some embodiments, the system is configured to provide UV-light in response to a signal from the control unit, so as to induce curing of the curable liquid.

Method

In another aspect of the invention, there is a method for manufacturing a cured article, the method comprising: (i) providing a fabrication system comprising: a chamber containing an immersion liquid; a reservoir comprising a curable liquid being immiscible with the immersion liquid, wherein the reservoir is in operable communication with an actuator; a port in fluid communication with the reservoir; a support configured for binding the curable liquid and in operable communication with the port; (ii) injecting a predetermined volume of the curable liquid on top or in close proximity to the support, so as to obtain at least one surface of the curable liquid immersed within the immersion liquid, thereby providing a predetermined shape to the at least one surface; and (iii) providing the predetermined volume of the curable liquid under conditions sufficient for curing, thereby manufacturing the article with a predetermined curvature and/or predetermined shape. In some embodiments, the port of the fabrication system is configured for providing the curable liquid in contact with the support.

In some embodiments, the method is for manufacturing an optical article. In some embodiments, optical article comprises a lens, and optical mirror, etc. In some embodiments, the method is for manufacturing a lens having at least one optical surface, wherein the at least one optical surface is as described herein. In some embodiments, the method is for manufacturing a lens characterized by at least one dimension (e.g. height) being greater than the capillary length of the material (i.e. a curable liquid). In some embodiments, the curable liquid is a liquid polymer. In some embodiments, the liquid polymer is curable. In some embodiments, the article is the article of the invention. In some embodiments, the terms "article" and "cured article" are used herein interchangeably.

In some embodiments, the step (i) of the method comprises providing the fabrication system of the invention. In some embodiments, the step (i) comprises manufacturing the fabrication system by a 3D printing method. Such 3D printing methods are well-known in the art.

In some embodiments, the step (i) comprises providing a fabrication system and further filling the chamber with the immersion liquid. In some embodiments, the step (i) comprises filling the lower reservoir with the immersion liquid. In some embodiments, the volume of the immersion liquid is sufficient for immersing at least one surface of the curable liquid within the immersion liquid. In some embodiments, the volume of the immersion liquid is sufficient for immersing the upper and the lower surface of the curable liquid.

In some embodiments, the step (i) comprises providing a reservoir comprising the curable liquid in fluid communication with the port, thereby obtaining the system configured for injecting a predetermined volume of the curable liquid into the chamber via the port. In some embodiments, the step (i) comprises providing the support configured for binding the curable liquid. In some embodiments, the step (i) comprises pre-treating at least one surface of the support, thereby enhancing the affinity of the at least one surface to the curable liquid. In some embodiments, the pre-treatment comprises any treatment suitable for controlling wettability of the at least one surface of the support.

In some embodiments, the method comprises (i) providing the fabrication system, (ii) injecting a predetermined volume of the curable liquid into the chamber, thereby obtaining the curable liquid bound or adhered to the support, and further comprising (iii) filling the chamber with the immersion liquid, wherein the chamber is as described herein.

In some embodiments, the method comprises (i) providing the fabrication system, (ii) injecting a predetermined volume of the curable liquid on top of or in close proximity to the support, thereby obtaining the curable liquid bound or adhered to the support, and further comprising (iii) filling the chamber with the immersion liquid, wherein the chamber is as described herein.

In some embodiments, the immersion liquid of the invention is characterized by sufficient rheological properties, such as viscosity, suitable for use thereof as an immersion liquid. One skilled artisan will appreciate, that an immersion liquid has to enable the formation of the predetermined curvature, and/or geometric shape of the curable liquid volume immersed therewithin. In some embodiments, the immersion liquid of the invention is characterized by sufficient density so as to enable immersion of the curable liquid volume into the immersion liquid. In some embodiments, the density of the immersion liquid is set to provide a predetermined buoyancy (e.g. buoyancy sufficient for pre-defining a curvature of at least one surface of the curable liquid). In some embodiments, the density of the immersion liquid of the invention is set to provide neutral buoyancy conditions. In some embodiments, the density of the immersion liquid is set to provide conditions being within 30%, within 25%, within 20%, within 15%, within 10%, within 5%, within 3% deviation from the neutral buoyancy, including any range between. In some embodiments, the immersion liquid of the invention is immiscible with the curable liquid. In some embodiments, the immersion liquid comprises a hydrophilic liquid and the curable liquid is hydrophobic. In some embodiments, the immersion liquid of the invention comprises a lipophilic liquid and the curable liquid is hydrophilic. In some embodiments, the immersion liquid comprises a polar solvent. In some embodiments, the immersion liquid of the invention comprises water.

In some embodiments, the immersion liquid of the invention comprises an aqueous solution. In some embodiments, the immersion liquid of the invention comprises an aqueous solution of a glycol. In some embodiments, the immersion liquid of the invention comprises an aqueous solution of a polyol. In some embodiments, the immersion liquid of the invention comprises glycerol or a mixture of glycerol and water. In some embodiments, the immersion liquid comprises water as a solvent and an additive, such as an organic and/or an inorganic salt (e.g. acetate, carbonate, halide, hydroxide, sulfate, thiosulfate, or bicarbonate salt), an organic water miscible compound (such as glycerin, methanol, ethanol, acetone). In some embodiments, the immersion liquid is chemically stable under curing conditions. In some embodiments, the immersion liquid has a boiling point compatible with the manufacturing conditions. In some embodiments, the immersion liquid is chemically inert with respect to the curable liquid. In some embodiments, the immersion liquid comprises a fluorocarbon oil. Such fluorocarbon oils are immiscible with most other liquids, and can thus serve as an immersion liquid for a variety of curable liquids. The density of the fluorocarbon oils can be controlled by mixing several types of fluorocarbon oils, or by mixing with specific organic compounds that are miscible therewith (e.g. Hexane). Such fluorocarbon oils comprise inter alia perfluoroperhydrophenanthrene, tetradecafluorohexane, methoxyperfluorobutane, 1H,1H,2H,2H-Perfluoro-1-octanol, Kritox, Fluorinert, Cytop, etc.

In some embodiments, the immersion liquid of the invention has a density different from the density of the curable liquid of the invention. In some embodiments, the density of the immersion liquid is greater than the density of the curable liquid. In some embodiments, the density of the immersion liquid of the invention is less than the density of the curable liquid of the invention. In some embodiments, the immersion liquid of the invention has a density set to provide a buoyancy sufficient for predefining a curvature of at least one surface (e.g. upper surface) of the curable liquid. In some embodiments, the immersion liquid of the invention has a density set to provide a buoyancy sufficient for predefining a curvature of two surfaces (upper and lower surface) of the curable liquid of the invention. In some embodiments, the immersion liquid has a density set to provide a buoyancy sufficient for predefining a curvature of two surfaces (upper and lower surface) of the curable liquid of the invention.

In some embodiments, provided herein a method for manufacturing an article, wherein the article height is substantially greater than the height provided by the capillary length. In some embodiments, the height of the article is at least 1.5 times, at least 2 times, at least 3 times, at least 4 times, at least 5 times, at least 7 times, at least 8 times, at least 10, at least 15, at least 20, at least 30, at least 50, times greater than the capillary length of the uncured curable liquid, including any range between.

In some embodiments, the immersion liquid of the invention has a density set to provide a buoyancy sufficient to overcome a gravitational force exerted on the immersed curable liquid. In some embodiments, the immersion liquid of the invention having a density greater than the density of the curable liquid provides a positive buoyancy to the curable liquid, thereby increasing a positive curvature of the upper surface of the polymer. In some embodiments, the immersion liquid has a density set to provide a buoyancy sufficient for predetermining a curvature of at least one surface of the curable liquid. In some embodiments, the immersion liquid has a density set to provide a buoyancy sufficient for predetermining a curvature of two surfaces of the curable liquid. In some embodiments, the immersion liquid has a density set to provide a buoyancy sufficient for obtaining a predetermined curvature of at least one surface (e.g. the upper surface). In some embodiments, the method of manufacturing an article comprising an upper surface having a positive curvature comprise providing the fabrication system, wherein the chamber is filled with the immersion liquid having a density greater than the density of the curable liquid. In some embodiments, the density sufficient for forming a predetermined curvature of the curable liquid is calculated based on the Equation 2.2.

In some embodiments, the immersion liquid of the invention having a density less than the density of the curable liquid provides a negative buoyancy to the curable liquid, thereby reducing a positive curvature of at least one surface of the polymer. In some embodiments, the immersion liquid having a density less than the density of the curable liquid provides a negative buoyancy forming an article with at least one surface having a negative curvature. In some embodiments, the immersion liquid has a density set to provide a negative buoyancy sufficient for obtaining at least one surface having a deflated shape (i.e. the height is less than a predetermined curvature of at least one surface (e.g. the upper surface).

In some embodiments, the method is for manufacturing an optical article under neutral buoyancy conditions. In some embodiments, the step (ii) of the method comprises injecting a predetermined volume of the curable liquid into the chamber. In some embodiments, the curable liquid is injected into the chamber via the port. In some embodiments, in response to a signal form the control unit, the actuator initiates injection of the curable liquid into the chamber via the port. In some embodiments, the actuator increases the pressure with the reservoir filled with the curable liquid, so as to transfer the curable liquid into the chamber. In some embodiments, the step (ii) and/or the step (iii) of the method of the invention is performed under neutral buoyancy conditions. In some embodiments, the immersion liquid and the curable liquid are selected so as to result in neutral buoyancy conditions.

In some embodiments, the step (ii) is for binding the curable liquid to the support. In some embodiments, the control unit calculates the predetermined volume of the polymer, according to the predetermined dimension and the predetermined surface curvature of the article. In some embodiments, the predetermined volume is sufficient for (i) binding the curable liquid to the support and (ii) for shaping the article. In some embodiments, the predetermined volume is sufficient for binding at least one surface of the curable liquid to the support. In some embodiments, the predetermined volume is sufficient for substantially filling the lumen defined by the support (e.g. binding frame). In some embodiments, the predetermined volume is sufficient for forming a spherical or a non-spherical lens (biconcave, biconvex, bi-focal, doublet, cylindrical saddle or meniscus structure) wherein the lens has at least one predetermined dimension and at least one surface with a predetermined curvature.

In some embodiments, the curable liquid of the invention is immiscible with the immersion liquid. In some embodiments, the curable liquid of the invention is water immiscible. In some embodiments, the curable liquid is immiscible with the immersion liquid and is curable. In some embodiments, the curable liquid is suitable for forming a lens. In some embodiments, the curable liquid of the invention is transparent in the UV-vis and/or IR region. In some embodiments, the curable liquid of the invention comprises an uncured polymer. In some embodiments, the curable liquid of the invention comprises a cross-linkable polymer. In some embodiments, the curable liquid of the invention comprises a thermoset polymer.

Polymerizing or curing can be carried out in any manner, such as for instance, irradiating with electromagnetic radiation or thermal radiation having sufficient energy to initiate a polymerization or a cross-linking reaction. In some embodiments, the curable liquid comprises a monomeric chemical species, such as a chemical species having one or more functional groups or moieties that can react with the same or different functional groups or moieties of another monomeric chemical species to form one or more covalent bonds, such as in a polymerization reaction. A polymerization reaction, in some embodiments, comprises a free radical polymerization. Polymerizing or curing, as used herein refers to a hardening process, resulting in a substantially solid article. In some embodiments, the cured article refers to a stable article, wherein stable is as described herein.

Optionally, the curable liquid of the invention refers to a composition comprising at least one of: a monomer, an oligomer, a polymer or a mixture thereof, wherein the composition is at least partially polymerizable (e.g. via free-radical polymerization) upon exposure to light in the UV and/or visible range. In some embodiments, the curable liquid is a liquid polymer comprising any methacrylate or acrylate resin which polymerizes upon exposure to UV light. In some embodiments, the polymerization occurs in the presence of a free radical photoinitiator. In some embodiments, the liquid polymer comprises one or more low molecular weight materials, such as methacrylates, dimethacrylates, triacrylates, and diacrylates, or any combination thereof.

In some embodiments, a photoinitiator comprises an alpha-cleavage type (unimolecular decomposition process) photoinitiator or a hydrogen abstraction photosensitizer-tertiary amine synergist, operable to absorb UV light, preferably between 200 nm and 400 nm or between 300 nm and 385 nm, to yield free radical(s).

In some embodiments, the liquid polymer comprises a photopolymer.

As used herein, the term "photopolymer" refers to a photo-polymerizable molecule being in form of a monomer, an oligomer, a polymer, or a mixture thereof. In one exemplary embodiment, the photo-polymerizable molecule comprises a photo-polymerizable unsaturated moiety (e.g. a vinyl group or an allyl group). In some embodiments, the photo-polymerizable molecule is photo-polymerizable or photo-curable at wavelengths ranging from about 200 nm to about 400 nm. Alternatively, the photo-polymerizable molecule is photo-polymerizable at visible wavelengths of the electromagnetic spectrum.

Non-limiting examples of photo-polymerizable molecules comprise: styrene, N-Vinylpyrrolidone, allyl acrylate, diacrylates (such as epoxides, urethanes, ethers, or esters functionalized by acrylate), tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, tridecyl methacrylate, tri(meth)acrylates (e.g., 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, hydroxyethyl methacrylate (HEMA), and tris(2-hydroxy ethyl) isocyanurate triacrylate) or any combination thereof.

In some embodiments, the liquid polymer comprises a self-curable polymer. In some embodiments, the liquid polymer comprises a hydrophobic polymer. In some embodiments, the liquid polymer comprises a lipophilic polymer.

In some embodiments, the liquid polymer comprises a thermoset polymer. In some embodiments, the liquid polymer is curable by exposing the polymer to thermal radiation. In some embodiments, the liquid polymer comprises the same polymer as the support.

In some embodiments, the curable liquid of the invention further comprises an inorganic particle. In some embodiments, the curable liquid is a dispersion of inorganic particles within a solvent or within a curable polymer. In some embodiments, the curable liquid is in a form of a dispersion or emulsion. In some embodiments, the curable liquid is a composite material. In some embodiments, the composite material comprises inorganic particles (e.g. silica nanoparticles) and a curable polymer or resin (e.g. acrylate-, or acrylate ester-based resin). In some embodiments, the inorganic particle is a nano-particle having a diameter between 10 and 500 nm, between 10 and 50 nm, between 50 and 100 nm, between 100 and 150 nm, between 150 and 200 nm, between 200 and 300 nm, between 300 and 500 nm, including any range between. In some embodiments, the inorganic particle is a metal oxide particle. In some embodiments, the inorganic particle comprises any of silica, zirconia, titania, iron (III or II) oxide, magnesium oxide or any combination thereof.

In some embodiments, the curable liquid of the invention (optionally in a form of a dispersion or emulsion) is characterized by a fluidity compatible with an injection device. In some embodiments, the curable liquid of the invention (optionally in a form of a dispersion or emulsion) is characterized by a viscosity appropriate for injection of the curable liquid. In some embodiments, the curable liquid of the invention (optionally in a form of a dispersion or emulsion) is injectable. In some embodiments, the curable liquid of the invention (optionally in a form of a dispersion or emulsion) is injectable and is characterized by a viscosity as described herein. In some embodiments, the curable liquid of the invention (optionally in a form of a dispersion or emulsion) is characterized by a fluidity suitable for injection of the curable liquid. Fluidity range suitable for injection of the liquid is known in the art, and depends inter alia on physico-chemical parameters of the liquid (e.g. viscosity, surface tension) and/or on the ambient conditions, such as temperature, pressure, etc.

In some embodiments, the curable liquid comprises the curable polymer (e.g. HEMA) and an inorganic nano-particle (e.g. silica). In some embodiments, the w/w concentration of the inorganic nano-particle (e.g. silica) within the curable liquid is between 5 and 80%, between 5 and 10%, between 10 and 20%, between 20 and 30%, between 30 and 40%, between 40 and 50%, between 50 and 60%, between 60 and 70%, between 70 and 80%, including any range or value therebetween.

In some embodiments, the curable liquid on top of the support is characterized by a contact angle as described herein.

In some embodiments, the curable liquid characterized by a water contact angle of at least 95°, at least 100°, at least 110°, at least 120°, at least 130°, at least 140°, at least 150°, at least 160° including any range between.

Non-limiting examples of liquid polymers include but are not limited to polydimethylsioloxane (PDMS), polyacrylate, polyurethane, a photopolymer (e.g. Colorado photopolymer), a photo adhesive (e.g. NOA81), aliphatic polyester urethane acrylate oligomer, urethane (meth)acrylate resin, a (meth-)acrylate resin, a (meth-)acrylate amine oligomeric resin, a cycloaliphatic epoxy resin, a cyanate ester-based resin, a silicon polyurethane resin, and a dual cure resin (such as epoxy, silicon, etc.) or any combination thereof.

In some embodiments, the curable liquid is substantially polymerizable or curable by applying any of the curing methods as described herein. In some embodiments, the curable liquid is substantially polymerizable under curing conditions as described herein.

As used herein the term "curing" refers to hardening a polymeric material by crosslinking of polymeric chain. Such crosslinking may result in the formation of a tridimensional polymeric network. Optionally, curing may refer to UV-induced crosslinking of the unsaturated moieties, such as carbon-carbon double bonds.

In some embodiments, the curable liquid is characterized by a viscosity of at least 2 cP, at least 10 cP, at least 20 cP, at least 30 cP, at least 50 cP, at least 100 cP, at least 1000 cP, at least 5000 cP, including any range between. In some embodiments, the curable liquid is characterized by a viscosity of between 500 and 7000 cP, between about 1000 and about 10000 cP, including any range between. In some embodiments, the curable liquid has a viscosity sufficient for supporting the structural integrity of the curable liquid during the manufacturing process of the invention (e.g. steps i and ii).

In some embodiments, the step i and the step ii of the method is for obtaining the article with a predetermined geometrical shape or curvature. In some embodiments, the step i and the step ii of the method is for manufacturing the article with at least one surface having a predetermined curvature. In some embodiments, the step i and the step ii of the method is for obtaining the article with at least one predetermined dimension (e.g. diameter). In some embodiments, the geometrical shape and/or surface curvature of the article is predetermined by the density of the immersion liquid and by the volume of the curable liquid. In some embodiments, the step i and the step ii of the method is for coating a substrate. In some embodiments, the method is for coating a substrate, thereby obtaining a surface of the substrate characterized by roughness as described herein. In some embodiments, a curvature of at least one surface (e.g. an optical surface) of the article is predetermined by the buoyancy induced by the immersion liquid and by the volume of the curable liquid.

In another aspect, provided herein a method for controlling at least one surface curvature of the article. In some embodiments, method for controlling at least one surface curvature of the article comprises controlling at least one of (i) the volume of the curable liquid, (ii) the volume of any one of the first immersion liquid and the second immersion liquid. In some embodiments, provided herein a method for controlling a plurality of surface curvatures of the lens, thereby manufacturing a meniscus lens, as described hereinbelow.

In some embodiments, the method of the invention comprises step (iii) of curing the curable liquid (e.g. the shaped polymer). In some embodiments, conditions sufficient for curing comprise exposing the curable liquid of step (ii) to a thermal radiation, a UV/vis irradiation or both. In some embodiments, the curable liquid of step (ii) is the curable liquid having a predetermined shape and/or curvature (i.e. the shaped polymer).

In some embodiments, curing comprises exposing the uncured curable liquid in contact with the support to electromagnetic radiation (such as UV-radiation, electron beam, X-ray) for a time sufficient for at least partial curing of the curable liquid. In some embodiments, curing comprises a process selected from thermal curing and UV-curing. In some embodiments, curing comprises thermal curing and UV-curing. In some embodiments, thermal curing and UV-curing are performed simultaneously or subsequently.

In some embodiments, thermal curing comprises providing at least a part of the curable liquid to a temperature between 40 and 1000° C. In some embodiments, thermal curing further comprises drying. In some embodiments, thermal curing further comprises a post-processing technique, such as sintering. Sintering is a well-known procedure applied to a porous inorganic substrate (e.g. glass or silica, ceramics, titania, zirconia etc.) so as to induce compacting or stiffening of the substrate by heat (800-2000° C.) or by pressure.

In some embodiments, curing is by exposing the first curable liquid in contact with the support to electromagnetic radiation in a visible and/or infrared light spectrum. In some embodiments, curing is by exposing the curable liquid to electromagnetic radiation having a wavelength between 400 and 2000 nm, between 400 and 600 nm, between 600 and 800 nm, between 800 and 1000 nm, between 700 and 1000 nm, between 1000 and 1500 nm, between 1500 and 2000 nm, including any range or value therebetween.

In some embodiments, thermal curing is applied to the curable liquid comprising a thermally curable compound (e.g. a thermosetting polymer, as described hereinabove).

In some embodiments, UV-curing comprises exposing at least a part of the curable liquid, to UV or visible radiation under conditions suitable for curing at least a part of the curable liquid. In some embodiments, curing or UV-curing results in at least partially cured curable liquid.

In some embodiments, conditions suitable for curing comprise an irradiation time ranging from 0.1 to 100 seconds(s). In some embodiments, conditions suitable for curing comprise thermal exposure to a temperature between 10 and 80° C. In some embodiments, conditions suitable for curing comprise thermal exposure to a temperature between 10 and 80° C. and an irradiation time ranging from 0.1 to 100 s. In some embodiments, conditions suitable for curing comprise thermal exposure to a temperature between 10 and 60° C., between 10 and 20° C., between 10 and 25° C., between 10 and 30° C., between 20 and 30° C., between 20 and 60° C., between 20 and 50° C., between 20 and 40° C., between 25 and 40° C., between 25 and 50° C., between 50 and 100° C., between 100 and 200° C., between 200 and 300° C., between 300 and 400° C., between 400 and 500° C., between 500 and 600° C., between 600 and 700° C., between 700 and 800° C., including any range or value therebetween.

In some embodiments, conditions suitable for curing comprise an irradiation time ranging from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, from 0.1 to 100 s, including any range or value therebetween.

In some embodiments, the irradiation time is sufficient for at least partial curing or solidification of the curable liquid. In some embodiments, the irradiation time is sufficient for at least 50%, at least 60%, at least 70%, at least 80%, at least 90%, at least 95%, at least 97%, curing or crosslinking of the curable liquid (e.g. the first liquid polymer).

In some embodiments, curing comprises exposing the uncured curable liquid to an electromagnetic radiation dose in a range between 50 and 400 mJ/cm2, between 150 and 400 mJ/cm2, between 50 and 150 mJ/cm2, between 150 and 400 mJ/cm2, between 200 and 400 mJ/cm2, between 300 and 400 mJ/cm2, including any range or value therebetween.

In some embodiments, a radiation dose required for curing is at least 100 mJ/cm2, at least 150 mJ/cm2, at least 200 mJ/cm2, at least 300 mJ/cm2, at least 400 mJ/cm2 including any range or value therebetween.

In some embodiments, the method further comprises any of post-processing methods such as deposition (ALD, CVD, PVD etc.).

In some embodiments, a cured article is devoid of adhesiveness. In some embodiments, a cured article is characterized by a hardness greater than a hardness of an uncured article. In some embodiments, a hardness a cured composition is greater than a hardness of an uncured article or of the uncured curable liquid by at least 20%, at least 40%, at least 60%, at least 80%, at least 100%, at least 200%, at least 300%, at least 500%, at least 1000%, at least 5000%, at least 100000%, including any range or value therebetween.

In some embodiments, a cured article is characterized by a cross-linking degree of the curable polymer ranging from 1 to 95%, from 1 to 10%, from 1 to 5%, from 5 to 15%, from 5 to 20%, from 5 to 25%, from 10 to 30%, from 30 to 50%, from 50 to 70%, from 70 to 80%, from 80 to 95%, including any range or value therebetween.

In some embodiments, curing results in at least 10%, at least 20%, at least 40%, at least 50%, at least 70%, at least 80%, at least 90% cross-linking of the curable polymer.

In some embodiments, a cured article is characterized by a surface roughness of at least one surface being as described hereinabove.

In some embodiments, the cured article comprises the cured polymer. In some embodiments, the cured article comprises a cured organic polymer (e.g. cured photopolymer, cured thermoset polymer). In some embodiments, the cured article comprises a cured inorganic polymer (e.g. silica or glass). In some embodiments, the cured article comprises a plurality of cured polymers.

In some embodiments, the method for manufacturing a meniscus lens comprises the step (i) of providing the system comprising the upper reservoir and the lower reservoir (as described in FIG. 3C). In some embodiments, the method comprises filling the second reservoir with a second immersion liquid.

In some embodiments, the method further comprises step (ii) of transferring the curable liquid into the chamber via the port, thereby obtaining the curable liquid bound to the binding frame, wherein the lower surface of the polymer faces or is in contact with the second immersion liquid and the upper surface of the polymer faces the upper reservoir. In some embodiments, the curable liquid bound to the support separates between the first and the second reservoir.

In some embodiments, the method further comprises step (iii) of providing the first immersion liquid into the upper reservoir, thereby obtaining a polymeric layer separating between the first immersion liquid and the second immersion liquid, wherein the polymeric layer has a plurality of surfaces with a predetermined curvature. In some embodiments, the first and the second immersion liquids have different densities. In some embodiments, the first immersion liquid has a density set to provide a buoyancy sufficient for predefining a curvature of the upper surface, and the second immersion liquid has a density set to provide a buoyancy sufficient for predefining a curvature of the lower surface of the curable liquid (e.g. biconcave, biconvex, bi-focal, doublet, cylindrical saddle or meniscus structure).

In some embodiments, the method further comprises step (iv) of varying (e.g. increasing or reducing) the volume of the curable liquid, and/or the volume of immersion liquid, thereby obtaining the curable liquid in a form of a meniscus lens. In some embodiments, the step (iv) comprises varying (e.g. increasing or reducing) the volume of the second immersion liquid, thereby controlling the curvature of any one of the surfaces of the curable liquid. In some embodiments, the method further comprises step (v) of curing the curable liquid, thereby manufacturing the meniscus lens.

EXAMPLES

Example 1

Fabrication of Optical Articles Via Fluidic Shaping

Materials and Methods

Immersion liquid: The immersion liquid was prepared by mixing water with glycerol in varying concentrations. This combination allows to reach any density between 0.997 g/mL for water at room temperature, to 1.263 g/mL for pure glycerol. The precise density can be measured directly by weighing a known volume of the immersion liquid. The simplest way to verify neutral buoyancy conditions is by injecting a small volume of the lens liquid directly into the immersion liquid, without any binding frame. When the immersion liquid is at neutral buoyancy, the injected lens liquid obtains the shape of a spherical drop and will remain stationary, without floating to the surface or sinking to the bottom.

Lens liquids and curing conditions: any curable liquid can be used to form a lens, provided that an appropriate immersion liquid can be identified. The inventors successfully utilized curing of PDMS (Sylgard 184, Dow, MI), and UV adhesive (NOA61, NOA63, NOA81, Norland, NJ) so as to form exemplary lenses of the invention. The PDMS lenses are cured by incubating them at 80 C for 1.5 hr, at 60 C for 4 hr, or at room temperature for 24 hr. The UV adhesive is cured by exposure to light at 365 nm (a 36 W consumer grade nail lamp) for 2-5 min, depending on the thickness of the lens and the specific adhesive chosen. Since both PDMS and Norland adhesives are immiscible in water and have densities between ~1.03 (PDMS) g/mL and ~1.12 g/mL (Norland), the water\glycerol-based immersion liquid allowed us to precisely control the density difference.

Spherical Lenses

Figure 6A:
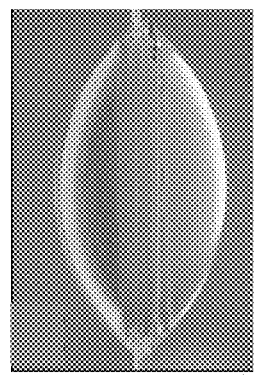
FIGS. 6A-C are images of exemplary spherical and non-spherical cured articles of the invention. Experimental images of spherical lenses produced using ring-shaped binding surfaces.

Consider the injection of a curable lens liquid into a binding frame submerged within an immiscible immersion liquid environment, as illustrated in FIG. 3. Under such conditions, in addition to gravity, the lens liquid experiences a buoyancy force. When the density of the immersion liquid matches that of the lens liquid, neutral buoyancy conditions are achieved, eliminating the effect of gravity, and yielding an infinite capillary length. The shape of the resulting lens is then determined by the injected volume and the geometry of any binding surfaces in contact with the lens liquid. Exemplary spherical lenses manufactured as described hereinabove, are represented in FIG. 6A. When the volume of the curable liquid shaping the exemplary lens ($V_0$), is larger than the volume enclosed by the binding frame $V_{frame}=\pi R_0^2 * d$, the curable liquid volume obtains a positive curvature (i.e. a convex lens), wherein $R_0$ refers to a radius of the binding frame; and d refers to frame height. FIG. 6A demonstrates the ability to control the curvature of a positive lens by varying the injected volume. FIG. 6C presents similar results for a taller frame with $V_0<V_{frame}$, in which case the curable liquid interfaces protrude inward, yielding a negative (concave) lens.

Figure 6B:
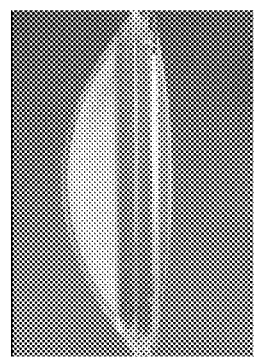
Figure 6C:
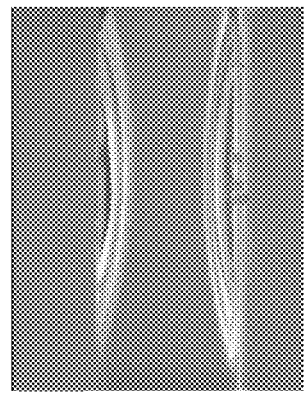

FIG. 6B shows the shapes of a positive, fixed-volume lens, at various densities of the immersion liquid. The up-down symmetry can also be broken by varying the volume of the curable liquid (e.g. via a control unit, as described herein), thus effectively inflating or deflating the lens liquid, resulting in meniscus-type lenses.

Once the curable liquid assumes its minimum energy shape, it can be solidified by standard methods. The inventors demonstrated the fabrication of a variety of lenses based on thermal curing of PDMS and on UV curing of an optical adhesive, as described in the materials and methods.

FIG. 2 presents a collection of solid lenses produced by the fluidic shaping method. FIG. 2A shows the simplest case of a positive spherical lens produced using a ring-shaped binding surface. FIG. 2B shows a doublet lens produced by a two-step process, where a negative lens was first formed and then used as a base for a positive lens made from a different material (here colored blue for better visualization). FIGS. 2C and 2D show respectively a saddle (toroidal) lens and a cylindrical lens created using different volumes injected into a binding surface composed of a rectangular pad with two perpendicular walls at its sides. FIG. 2E shows a bi-focal lens produced by a two-step process, where a lens of one curvature was cut in half and used as part of a new binding surface for a lens with a different curvature. Since both parts were made using the same polymer (PDMS) they formed a seamless single unit. FIG. 2F shows a negative meniscus lens produced by increasing the enclosed volume below the lens. This type of lens is known to reduce spherical aberrations and is standardly used in the eyewear industry. Finally, FIG. 2G shows a 200 mm spherical telescope lens (two orders of magnitude above typical capillary lengths), demonstrating the scale invariance of the fluidic shaping method.

The exemplary approach described herein, produces lenses with extremely high surface quality. Atomic force microscopy (AFM) measurements performed across a 20×20 micron area, yielded surface roughness values of RMS=1.15 nm and Ra=0.84 nm. It is should be emphasized that the surface quality is the direct result of the smoothness of fluidic interfaces and is therefore independent of the lens' shape. Furthermore, a dispersion of polymerizable acrylate resin (e.g. Methylmetacrylate, or HEMA) and nano-size silica particles has been utilized by the inventors for the fabrication of exemplary articles of the invention.

The PDMS and Norland Adhesives, which were successfully implemented by the inventors for the fabrication of exemplary articles, are insoluble in water and have densities between ~1.03 (PDMS) g/mL and ~1.12 g/mL (Norland). Accordingly, the inventors uses water as the immersion liquid, and the density of water was tuned with glycerol. Other polymers with higher densities would require appropriate immersion liquids. For example, Polycarbonate is a common and well characterized optical polymer with a density of ~1.3 gr/cm$^3$, beyond the density that could be achieved with glycerol. Additionally, curable liquids in a form of dispersions (e.g. HEMA-silica base dispersion) are also characterized by even higher density of about 1.6 gr/cm$^3$. In this case, sodium polytungstate may be used so as to allow a precise tuning of the density of water up to 3.1 gr/cm$^3$. Furthermore, heavy fluorinated oils such as FC770 (1.8 g/cm$^3$) can be utilized as immersion liquid. Heavy fluorinated oils can be mixed with hexane (0.65 g/cm$^3$) to tune the precise density of the immersion liquid, required for the formation of high-quality optical surfaces.

Aspheric Lenses

For small deviations from neutral buoyancy, symmetry is broken while the lens surfaces maintain their spherical shape. Equations (1, 1.6 and 2.3) allow to obtain a wide range of aspheric Bessel-shaped lenses, by controlling the injected volume, the enclosed volume, and the Bond number of the system. It is important to note that these fluidic shapes are stable to significant disturbances even for values of $B_o \sim 1$.

An exemplary article having a non-spherical surface defined by the Equation 1 or by the Equation 1.6 is represented by FIG. 5, showing a very good agreement between the solutions for the top and bottom interfaces given by the theory and experimentally measured ones. In this specific experiment the relevant physical parameters were $\Delta\rho=-6.5$ kg/mm$^3$, D=87.2 mm, $V_0$=48 ml, and $\gamma$=0.02 N/m. Noteworthy, the model does not have any fitting parameters, and the results are obtained directly by using actual physical parameters of the system.

To this end, the inventors demonstrated a method for fluidic shaping of high-quality optical articles, allowing for the first-time rapid prototyping of optics. The method is scale-invariant, and unlike its 3D printing counterparts, the required fabrication time is not proportional to the volume being produced, thus allowing to rapidly fabricate exemplary articles of any size. In addition, the method is compatible with a wide range of curable liquids with various optical and mechanical properties. The inventors identified four degrees of freedom for designing a fluidic optical exemplary article—the volume of the support, the enclosed volume of the curable liquid in contact with the support, the Bond number, and the shape or curvature of the article's surface. Importantly, the method does not require specialized equipment, and the nanometer-scale surface quality is naturally achieved, without the need for a cleanroom environment, expensive equipment, or complex post-processing (e.g., polishing). The simplicity and affordability of this method make it a natural candidate to serve inter alia, as platform for producing affordable eyewear, or of large high-quality telescope lenses, which are currently produced in laborious and expensive processes.

Example 2

Fluidic Shaping of Freeform Optical Articles

The inventors utilized fluidic shaping method for rapid fabrication of freeform optical articles. Using binding frames created with a standard 3D printer, the inventors demonstrated the ease of fabrication of several freeform exemplary articles. Frames defined by a single wavenumber have been used, to demonstrate common freeform surfaces such as saddles, tilts (bifocal), and quatrefoils, as well as frames defined by superposition of waves yielding arbitrary desired surfaces. All those exemplary articles enjoy a surface quality on the order of 1 nm, characteristic of the fluidic shaping method, without the need for any subsequent polishing steps.

Figure 7A:
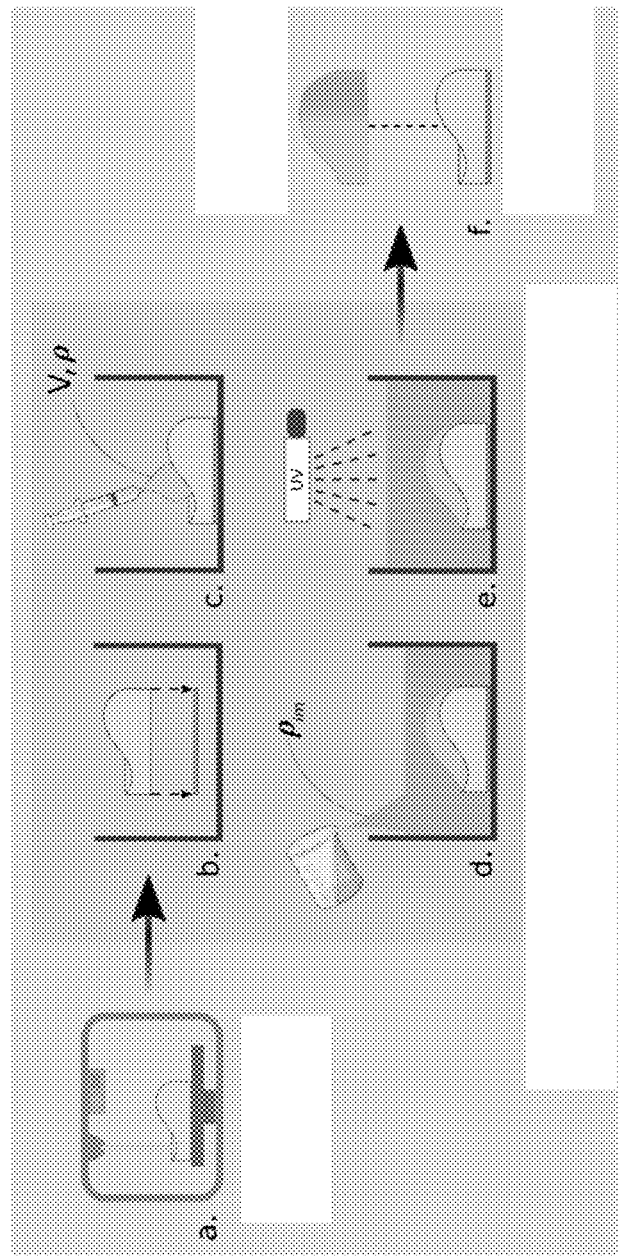
FIGS. 7A-B are illustration of an exemplary fabrication method, and of exemplary binding frames, which can be utilized for the fabrication of an exemplary article of the invention.
Figure 7B:
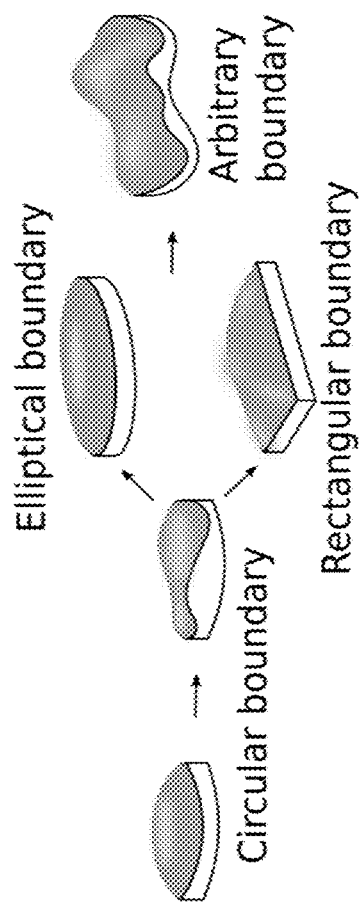

As illustrated in FIG. 7B, binding frames may be elliptical or rectangular frames (with height variation along their circumference). Elliptical frames are of particular interest in the context of eyewear, since such frames are expected to produce surfaces with both spherical and astigmatic corrections. Rectangular frames are also of specific interest, as they would allow the creation of structures with Cartesian symmetry such as gratings and prisms. Furthermore, an arbitrary frame shape with an arbitrary height variation along its path may be utilized by the inventors.

FIG. 7A illustrates the fabrication process of freeform surfaces using the fluidic shaping method. The inventors used a commercial 3D printer (Form 3, FormLabs, United states) to print a rigid cylindrical binding frame with a desired height variation along the azimuthal direction. The inventors sealed the bottom of the frame with a flat glass substrate and position it at the bottom of a larger container. The inventors injected a desired volume of optical liquid into the frame and fill the container with immersion liquid until the frame is entirely submerged. At this point, additional optical liquid can be added into the frame while ensuring proper contact between the liquid and the entire inner surface of the frame. Finally, the container has been illuminated with UV light for several minutes to solidify the optical liquid. The optical article is then ready and can be removed from the immersion liquid. The binding frame can be removed from the exemplary article and reused or can remain attached to it and serve as a mechanical interface.

FIG. 8 presents the design and fabrication of a quatrefoil exemplary article, defined by binding frame conditions of u $(R_{frame}, \theta) = 3 \sin(4\theta)$ mm. FIG. 8A presents the expected resulting surface for a Bond number of 0.2 and a volume of 4 ml. FIG. 8B presents the spatial curvature (which is linearly correlated with the optical power distribution) obtained from this exemplary article. As illustrated by the overlaid white circle in the image, one can expect that a circular object filling the field of view of the exemplary article would show distortion at four corners.

Figure 8B:
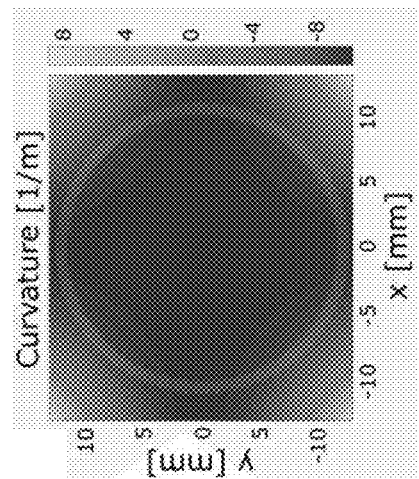
FIGS. 8A-G are images representing design and fabrication of an exemplary quatrefoil optical lens. The boundary condition of the binding frame is u ($R_{frame}$,θ)=3 sin (4 θ) mm, with $R_{frame}$=18 mm, an exemplary article volume of V=4 ml and a Bond number of $B_0$=0.2.
Figure 8A:
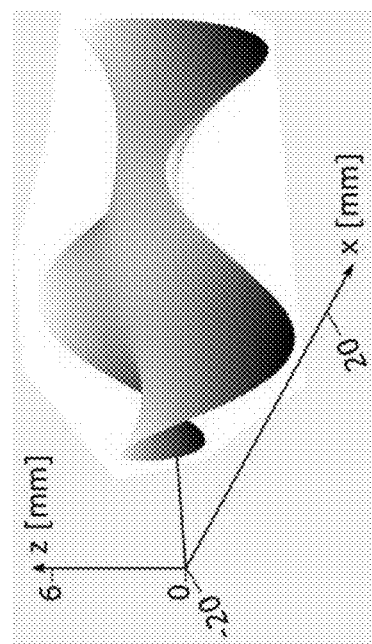
Figure 8C:
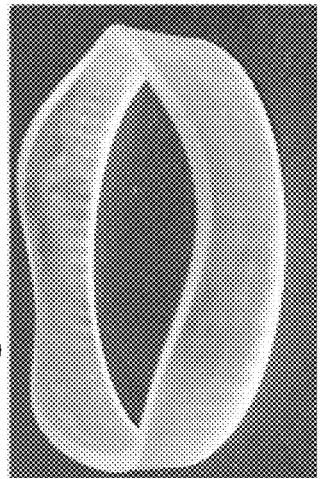
Figure 8D:
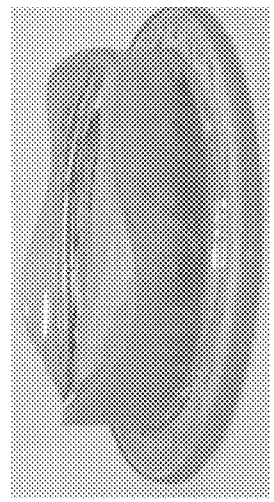
Figure 8E:
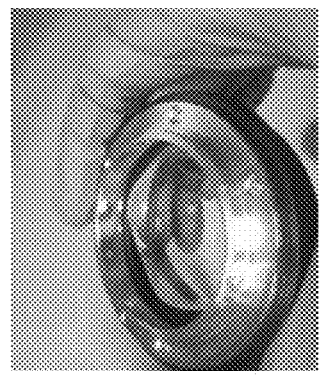
Figure 8G:
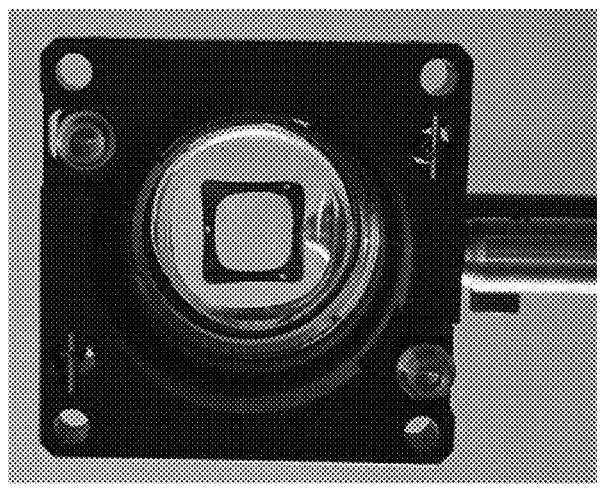
Figure 8F:
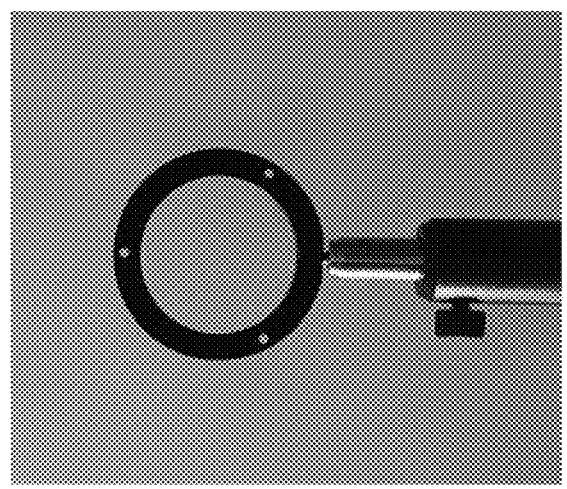

FIG. 8C presents a 36 mm diameter cylindrical frame, printed on a commercial 3D printer, and implementing the desired boundary conditions (i.e. 6 mm peak to peak sinusoidal wave with four periods over the circumference). As described in the above procedure, a 46 mm diameter glass window was attached to its bottom and filled with 4 ml of a photocurable polymer (Epoxy UV resin glue, Vidarosa) with a density of 1.07 g/ml. To achieve the desired Bond number of 0.2, the container was filled with an immersion liquid composed of 28.8% glycerol in deionized water. To solidify the lens, three 12 W UV lamps were used with a wavelength of 365 nm, at a distance of approximately 10 cm from the exemplary article, and allowed 3 min for complete curing. FIG. 8D presents the resulting exemplary article, and FIG. 8E shows its mounting within a standard 2" lens holder (SM2NFM2, Thorlabs, New Jersey). The entire fabrication process required 40 minutes to complete, of which 30 minutes were spent on 3D printing of the frame, and 10 minutes were spent on manual injection of the liquids, curing, removal from the container, and drying. FIGS. 8F-G provide a qualitative presentation of the non-uniform optical power produced by this quatrefoil element; FIG. 8F presents an image of a circular object without any intermediate optical article, whereas FIG. 8G presents an image of the same circular object when imaged through the quatrefoil. As expected from FIG. 8B, the image of the circular object is deformed at four corners, yielding a square shape.

Figure 9A:
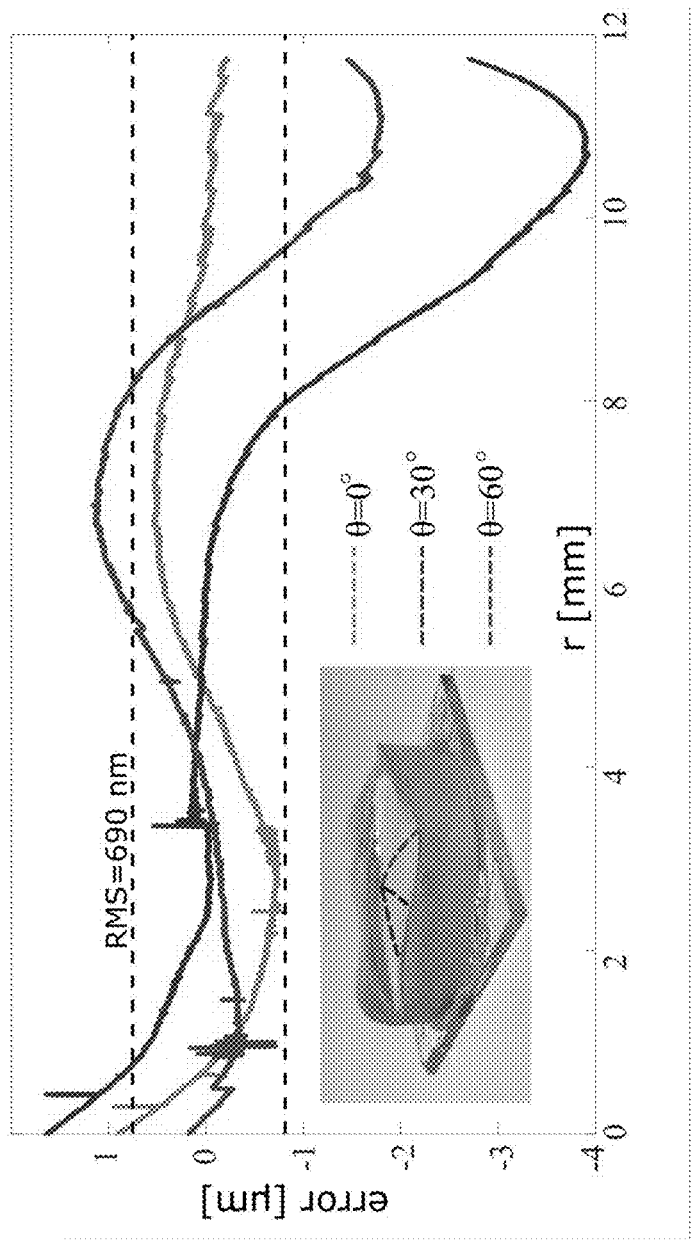
FIGS. 9A-B are a graph and an Atomic Force Microscope (AFM) micrograph of the optical surface of an exemplary quatrefoil optical lens.
Figure 9B:
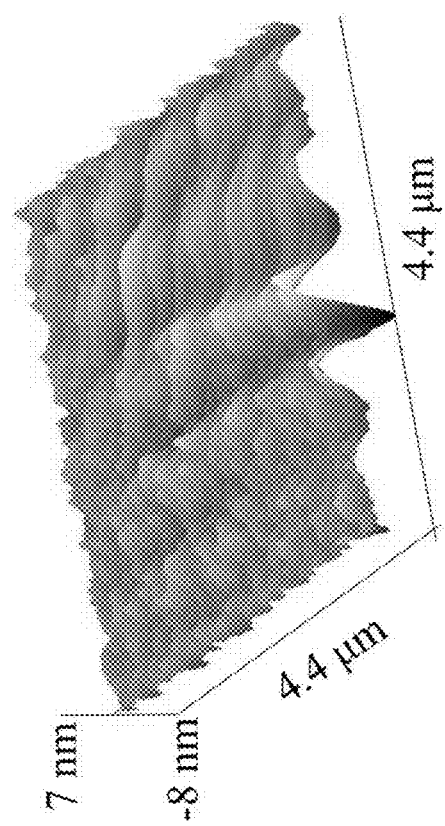

The surface roughness of the resulting articles was measured using atomic force microscopy (AFM) and obtained an RMS value of less than 1 nm, as represented by FIGS. 9A-B. Using a digital holographic microscope (DHM R-1000 LynceeTec, Switzerland) the topography of the resulting freeform surface along three radial lines (0°, 30°, 60°), has been measured with the angle set by a rotating stage (PR01/M, Thorlabs, New Jersey). Along each line, using a motorized X-Y stage (MS 2000, ASI, Oregon) the inventors took a series of 40 500×500 μm images with partial overlap between them, and stitched them together to form a continuous line by cross correlation between adjacent images. To this end, inventors used Matlab's "fminsearch" algorithm to find the least means squares fit between the three lines and the theoretical model, with the Bond number, the injected volume, and the amplitude of the frame-height variation serving as the free parameters. The resulting values from the fit are $B_0 = 2.91$, $V = 3.21$ ml, $b_4 = 0.56$ mm, and are within the expected tolerance of the current exemplary manufacturing process. FIG. 9A presents the difference between the measured surface height along the three radial lines, and the theoretical values along these lines using the extracted parameters. The results show that for radii smaller than 8 mm the differences between theory and measurements are capped at approximately 1 μm, and grow to 4 μm toward the edges of the frame. The RMS of the error, over all three lines, is 690 nm. FIG. 9B presents the measurement of the surface roughness of the resulting component using atomic force microscopy (AFM), showing an RMS value of less than 1 nm, as expected due to the smoothness of the liquid-liquid interface.

Example 3

Fabrication System

Figure 10A:
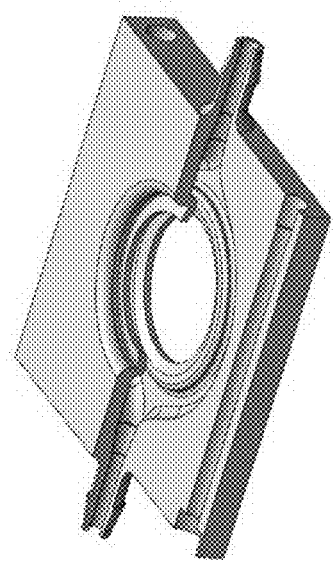

FIG. 11 presents an illustration of an exemplary device of the invention applicable for manufacturing of cured articles, such as lenses. The exemplary device comprises the binding frame (into which the lens liquid is injected), an immersion liquid container, a liquid injection system, a light source for polymerization, and a controlling unit that controls both the injection volume and the shape of the frame, according to the predefined curvature and/or shape. The container may be pre-filled with an immersion liquid (water with glycerol) and can be used repeatedly for production of multiple lenses. To create a lens, the user may insert an elastic circular frame into the frame holder (depicted in green), close the lid containing the array of LEDs, and set the desired spherical and cylindrical correction power of the lens in the controller. The liquid container may then be automatically elevated until the frame is fully submerged in the immersion liquid. As illustrated in FIGS. 10F-H, the binding frame may be initially stretched to its maximum length to minimize its internal volume and an initial amount of liquid will be injected into the frame until the frame is fully wetted. The stretching may be relaxed to the correct length required in order to achieve the desired astigmatic correction while the remaining amount of curable liquid may be injected to form the liquid lens with the predefined curvature. The user may then turn on the LEDs for a time sufficient for hardening (or curing) of the curable liquid, to obtain a hardened or a solid lens. Finally, the liquid container may be lowered, and the solid lens may be removed.

Figure 11A:
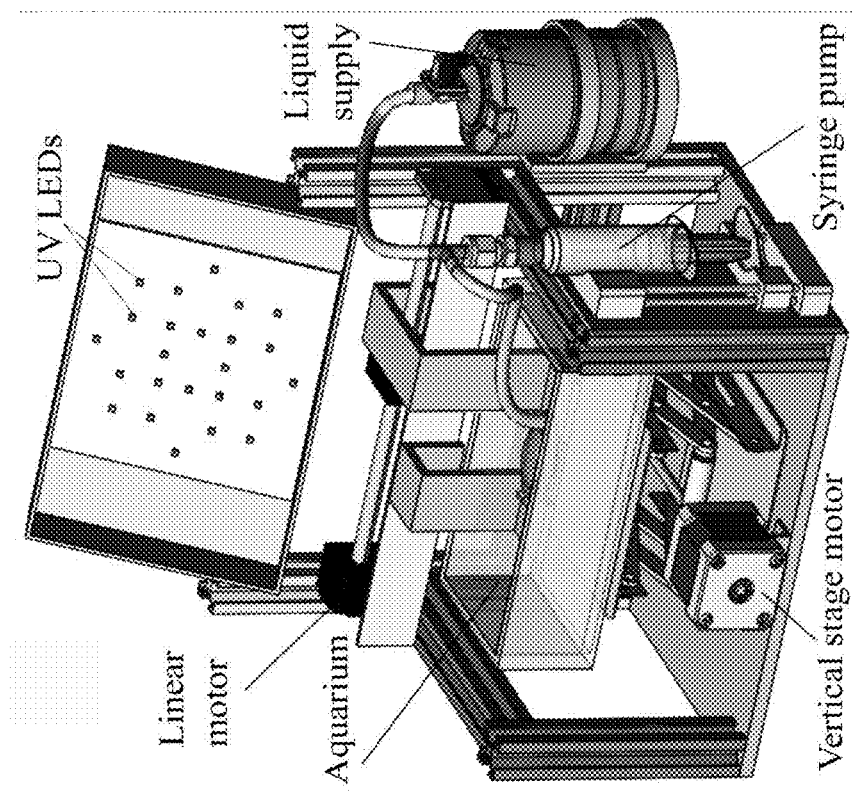
Figure 11C:
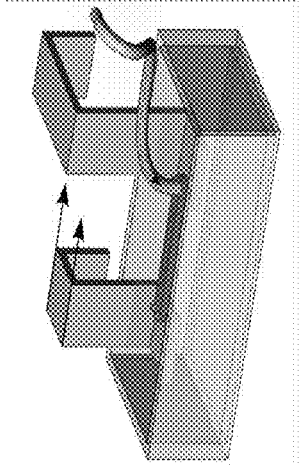
Figure 11B:
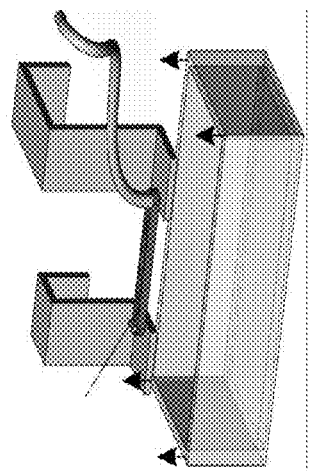
Figure 11D:
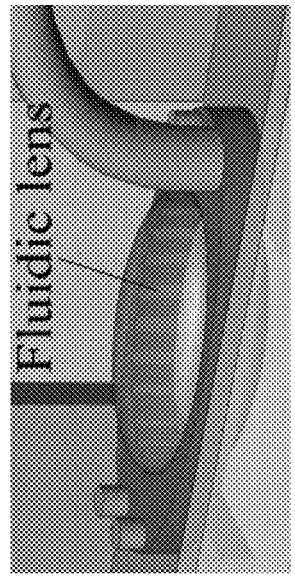

FIG. 11A represents a CAD illustration of an exemplary device of the invention applicable for manufacturing of lenses for vision correction. FIGS. 11B-D represent an elastic binding frame (depicted in green) located within the exemplary device and connected to the supply container filled with the curable liquid (depicted in pink). To deploy the lens, the chamber with the immersion liquid may be raised, such that the binding frame is fully submerged, and the binding frame is stretched to minimize its inner volume. The binding frame is initially filled with a small amount of curable liquid to fully wet its inner surface. The binding frame is then relaxed to the predetermined shape to obtain the correct astigmatic correction, and the rest of the curable liquid is then injected, as depicted by FIGS. 11 B-D and E-I.

Finally, the LED light source may be turned on to solidify the curable liquid, resulting in a cured or hardened lens.

The injection system may comprise an actuator (a syringe pump) that can dispense accurate volumes of the curable liquid, while applying the large forces required for the injection of the highly viscous liquids (~1000-5000 cSt). The injection can be carried out by a tube (depicted in pink) in fluid communication with the port located on the binding frame, as shown in FIGS. 11E-I. The main energy consumption is by the light source, requiring approximately 20 W over 120 s (curing time) and the syringe pump, requiring 20 W over a short duration of approximately 10 s (injection time). Since both are used alternately, the maximum power consumption may be 20 W. The entire device may be run from an 18 V 4000 mAh rechargeable Li-ion battery, which would enable fabricating approximately 100 lenses with a single charge. Each lens may require approximately 10-20 ml of the curable liquid, and thus a 1-liter supply container would be sufficient for 50-100 lenses. Since fabrication of a lens does not require supporting structures (in contrast, for example, to FDM/SLA 3D printing methods), there is 100% material utilization, and therefore substantially no waste. This makes the method both environmentally friendly and possible to operate in places without an organized waste handling infrastructure.

The resulting lenses may be characterized using a standard Lensometer, which is capable of measuring both refractive power and astigmatic corrections. This device is used routinely in the eyewear industry, with the acceptable accuracy of fractions of a diopter.

A chamber (e.g. immersion chamber) may be filled with immersion liquid composed of a single material, resulting in the formation of symmetric bi-convex or bi-concave lenses may be used. However, for non-spherical meniscus-shaped lenses (e.g. for eyewear glasses), a stratified chamber comprising a plurality of containers may be used, to separately control the immersion liquid volumes above and below the lens, resulting in meniscus lenses, as presented in FIG. 3C. Furthermore, it is possible to fabricate multifocal lenses by utilizing an exemplary device of the invention. A multifocal lens is a continuous piece that consists of multiple distinct regions with different optical powers, typically positive diopters in its lower region and negative diopters in its upper region. To produce such lenses, one may use a 3D printer to create an exemplary frame, such as depicted by FIG. 7B.

Beyond surface roughness, one of the key characteristics for the quality of an optical component is its surface irregularity, i.e. the deviation of its actual surface from the predetermined surface shape and/or curvature. Desired values for precision optics depend on the particular application, but are on the order of fractions of a wavelength. To achieve the desired accuracies, various fabrication parameters have to be precisely controlled, such as the injected volume, the difference in liquid densities, the illumination uniformity, and stresses in the material due to curing.

One of the key parameters to control is the predetermined volume of the curable liquid injected into the immersion chamber. For a spherical lens (obtained under perfect neutral buoyancy with a simple circular frame), the injected volume of the curable liquid directly predetermines its curvature. A surface accuracy of 100 nanometers on a 50 mm diameter lens requires controlling the injected liquid to a level of approximately 100 nL. High accuracy syringe pumps, which can provide controlled flow rates of as little as 12 nL/min at larger forces for very viscous materials are commercially available (e.g. Cetoni neMESYS XL 7000N), and may be implemented for this task.

Figure 12A:
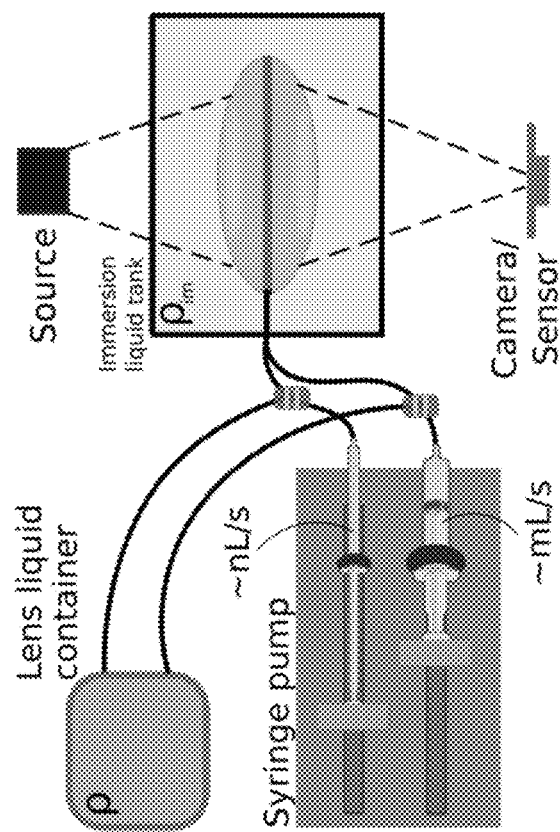
FIGS. 12A-C are illustrations representing an exemplary fabrication method of the invention under closed-loop control.
Figures 12B, 12C:
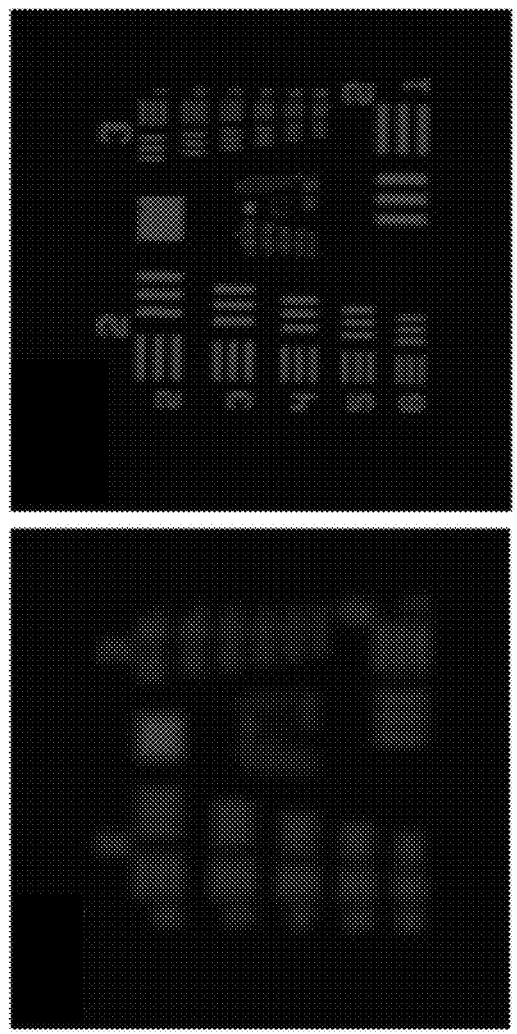

Alternatively, the injection procedure may consist of a first rapid and low-accuracy phase, followed by a slow/high-accuracy phase guided by the closed-loop control system. The simplest feedback control would be measuring the weight of the entire immersion liquid chamber on an analytical-grade balance. Additional possible feedback system may be to optically characterize the liquid lens in real-time by imaging through it. FIGS. 12B-C present the principle of such a system, where a liquid lens has been used to image a back-illuminated USAF 1951 target. When the amount of injected liquid is too small or too large, the image is out of focus, and it comes into focus only when the lens power matches the imaging distance to the target. Several cost-functions could be applied to such an image, including contrast and phase detection (as done in auto-focus mechanisms), or modulation transfer function (MTF) evaluation. Alternatively, a point source could be imaged to obtain the point spread function (PSF) of the lens, or a wavefront sensor could be used. In all cases the effect of the immersion liquid must be taken into account, e.g. by using standard optical simulation software such as Zemax.

Another parameter that must be accurately controlled, is the density of the immersion liquid. Immersion liquids may comprise a mixture of two miscible liquids of different densities whose specific ratio in the mixture would dictate the final density of the immersion liquid. For example, inventors found that water/glycerol solution results in a useful immersion liquid that allows to suspend a wide variety of polymers that are slightly heavier than water. The required accuracy in density for a 100 nm deviation in surface shape on a 50 mm diameter lens is approximately 8 mg/lit. A simple solution is to prepare a sufficiently large volume of the immersion liquid, allowing accurate absolute measurement. Commercial analytical balances (e.g. Mettler Toledo) could easily provide mg-level measurements. Here, too, a closed-loop control system may be implemented, where the direct characterization of the lens would control (for example) the addition of glycerol and water to respectively increase or decrease the immersion liquid density.

Figure 10B:
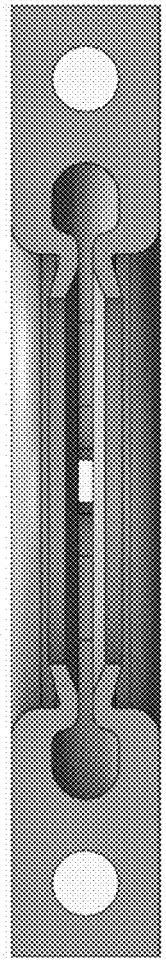

The accuracy of the injected volume and the accuracy of the immersion liquid's density can be reduced, hopefully, to sub-wavelength with the methods described above. In order to minimize changes to the lens shape (e.g. shrinkage and/or deformation) that result from the polymerization, a skilled artisan might consider the use of a flexible frame that is able to contract during polymerization, while maintaining its circular shape, such as one embedded within a 2D Hoberman mechanism. Another potential solution is using a rigid frame but whose cross-section profile is in the shape of the letter 'C', with the opening pointing inward (e.g. towards the curable liquid volume), as depicted in FIG. 10. The perimeter of such a 'C-Frame' thus serves as a fluidic channel through which the liquid could be injected radially into the frame from all directions, as shown in FIG. 10 C-F. During polymerization (and associated shrinkage), additional lens liquid would be 'pulled' naturally from the surrounding C-channel (that serves as a liquid supply that does not undergo polymerization) and thus reducing or eliminating the stress in the structure.

For characterization of the liquid component in real-time a Shack-Hartmann wave front sensor may be utilized. For measuring the surface of the solidified components, we will adapt a holographic microscope in our lab (DHM, LynceeTec), which provides a surface reading accuracy of ~4 nm RMS, to provide surface topographies over large areas. Currently the inventors have used it to obtain surface topography over small areas, and by coupling it with an XYZ stage and developing a stitching algorithm it is expected that significant surface areas may be characterized with a reasonable scan time.

General

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the term "bound" or "binding", in some embodiments thereof, refers to mount, fasten-to and/or provide a boundary condition.

As used herein, the singular form "a", "an" and "the" include plural references unless the context clearly dictates otherwise. For example, the term "a compound" or "at least one compound" may include a plurality of compounds, including mixtures thereof.

As used herein, the term "substantially" refers to at least 80%, at least 85%, at least 90%, at least 92%, at least 95%, at least 96%, at least 97%, at least 98%, at least 99%, including any range or value therebetween. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A fabrication system comprising:
   a chamber containing an immersion liquid when the fabrication system is in operation;
   a port adapted for being in fluid communication with a reservoir comprising a curable liquid;
   an actuator in operable communication with said reservoir and configured to induce flow of said curable liquid towards said port;
   a support in operable communication with said port, wherein said support is configured for binding said curable liquid;
   a control unit configured to control said actuator to induce flow of a predetermined volume of said curable liquid towards said port, so as to provide said curable liquid in contact with said support; wherein said predetermined volume is sufficient for shaping an article immersed within said immersion liquid and comprising at least one surface with a pre-defined curvature; wherein the control unit is configured to:
   (i) receive said pre-defined curvature; and
   (ii) control said actuator to induce flow of the predetermined volume of the curable liquid according to the received pre-defined curvature.

2. The fabrication system of claim 1, wherein said curable liquid and said immersion liquid are immiscible, and wherein a contact angle of said curable liquid on top of said support is less than 90°.

3. The fabrication system of claim 1, wherein said control unit is configured to calculate the predetermined volume of the curable liquid based on (i) buoyancy induced by said immersion liquid and (ii) surface tension of the curable liquid; wherein said support is in a form of a binding layer, or in a form of a binding frame; and wherein said at least one surface is in contact with the immersion liquid.

4. The fabrication system of claim 1, wherein the control unit is further in operable communication with an additional actuator, and wherein said control unit is configured to receive a pre-defined curvature of said article; and further configured to control via said additional actuator at least one of: (i) a volume, and (ii) a density of the immersion liquid, according to the received pre-defined curvature.

5. The fabrication system of claim 1, wherein the chamber comprises a first reservoir facing a first surface of the article and a second reservoir facing a second surface of the article, and wherein said first reservoir and said second reservoir are configured to contain said immersion liquid.

6. The fabrication system of claim 5, wherein the support is located between said first reservoir and said second reservoir.

7. The fabrication system of claim 5, wherein said control unit is configured to receive a pre-defined curvature of the first surface and of the second surface; and further configured to control at least one of: (i) a volume, and (ii) a density of the immersion liquid within said first reservoir and within said second reservoir, according to the received pre-defined curvature.

8. The fabrication system of claim 1, further comprising a curing element suitable for homogenously curing the curable liquid; wherein said curing element is selected from a light source, a heating element or both.

* * * * *